US008111834B2

(12) United States Patent
Kobayashi et al.

(10) Patent No.: US 8,111,834 B2
(45) Date of Patent: Feb. 7, 2012

(54) VEHICULAR ACTIVE NOISE CONTROL SYSTEM

(75) Inventors: Yasunori Kobayashi, Wako (JP); Toshio Inoue, Wako (JP); Akira Takahashi, Wako (JP); Kosuke Sakamoto, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 986 days.

(21) Appl. No.: 12/056,499

(22) Filed: Mar. 27, 2008

(65) Prior Publication Data

US 2008/0292110 A1 Nov. 27, 2008

(30) Foreign Application Priority Data

Mar. 28, 2007 (JP) ................................ 2007-085809

(51) Int. Cl.
*G10K 11/178* (2006.01)
*G10K 11/175* (2006.01)
*G10K 11/16* (2006.01)
*H04B 15/00* (2006.01)

(52) U.S. Cl. ...................... 381/71.4; 381/71.11; 381/86

(58) Field of Classification Search ................ 381/71.4, 381/71.8, 71.9, 71.11, 71.12, 86, 94.1
See application file for complete search history.

(56) References Cited

U.S. PATENT DOCUMENTS 4,506,380 A * 3/1985 Matsui ........................ 381/71.9
5,386,372 A * 1/1995 Kobayashi et al. ........... 700/280
5,524,057 A * 6/1996 Akiho et al. ................. 381/94.7
5,581,619 A * 12/1996 Shibata et al. ............... 381/71.4
5,638,305 A * 6/1997 Kobayashi et al. ........... 700/280
5,758,311 A 5/1998 Tsuji et al.
5,912,821 A * 6/1999 Kobayashi .................... 700/280
6,865,466 B2 3/2005 Voight et al.
7,340,065 B2 * 3/2008 Nakamura et al. ......... 381/71.11
7,352,869 B2 * 4/2008 Inoue et al. ................ 381/71.11
7,574,006 B2 * 8/2009 Funayama et al. ......... 381/71.12
7,633,257 B2 * 12/2009 Sakamoto et al. ............ 318/611
7,773,760 B2 * 8/2010 Sakamoto et al. ........... 381/71.9
7,792,312 B2 * 9/2010 Inoue et al. .................. 381/71.9
7,873,173 B2 * 1/2011 Inoue et al. .................. 381/71.4
7,876,910 B2 * 1/2011 Sakamoto et al. ........... 381/71.4
7,876,913 B2 * 1/2011 Kobayashi et al. ............. 381/86
7,885,417 B2 * 2/2011 Christoph .................. 381/71.11
2004/0247137 A1 12/2004 Inoue et al.
2006/0056642 A1 3/2006 Inoue et al.
2007/0230716 A1 * 10/2007 Kobayashi et al. ............. 381/86
2008/0152158 A1 * 6/2008 Sakamoto et al. ........... 381/71.4
2008/0192948 A1 * 8/2008 Kan et al. ..................... 381/71.4
(Continued)

FOREIGN PATENT DOCUMENTS

EP 1575163 9/2005
(Continued)

*Primary Examiner* — Edgardo San Martin
(74) *Attorney, Agent, or Firm* — Rankin, Hill & Clark LLP

(57) ABSTRACT

A frequency detecting circuit estimates the frequency fp of a propeller shaft based on the frequency fc of vehicle speed pulses, and calculates a control frequency fp' which is a harmonic of the frequency fp. A basic signal generator generates a basic cosine wave signal xp1 and a basic sine wave signal xp2 of the control frequency fp'. Adaptive filters and an adder generate a control signal Scp for canceling a driveline noise produced in a passenger compartment by the propeller shaft. A speaker outputs a canceling sound based on the control signal Scp into the passenger compartment.

14 Claims, 15 Drawing Sheets

U.S. PATENT DOCUMENTS

2008/0240456 A1* 10/2008 Sakamoto et al. ........... 381/71.4
2008/0240457 A1* 10/2008 Inoue et al. .................. 381/71.4
2009/0175461 A1* 7/2009 Nakamura et al. ........... 381/71.1

FOREIGN PATENT DOCUMENTS

JP 62-200034 12/1987
JP 03-203792 9/1991
JP 06-019485 1/1994
JP 06-043882 2/1994
JP 06-161473 6/1994
JP 2006-084532 3/2006
JP 3843082 8/2006

* cited by examiner

10A

| ADDRESS | WAVEFORM DATA |
|---|---|
| 0 | 0 |
| 1 | $A\sin(360° \times \frac{1}{N})$ |
| ⋮ | ⋮ |
| i | $A\sin(360° \times \frac{i}{N})$ |
| ⋮ | ⋮ |
| N | $A\sin(360° \times \frac{N-1}{N})$ |

FIG. 5A
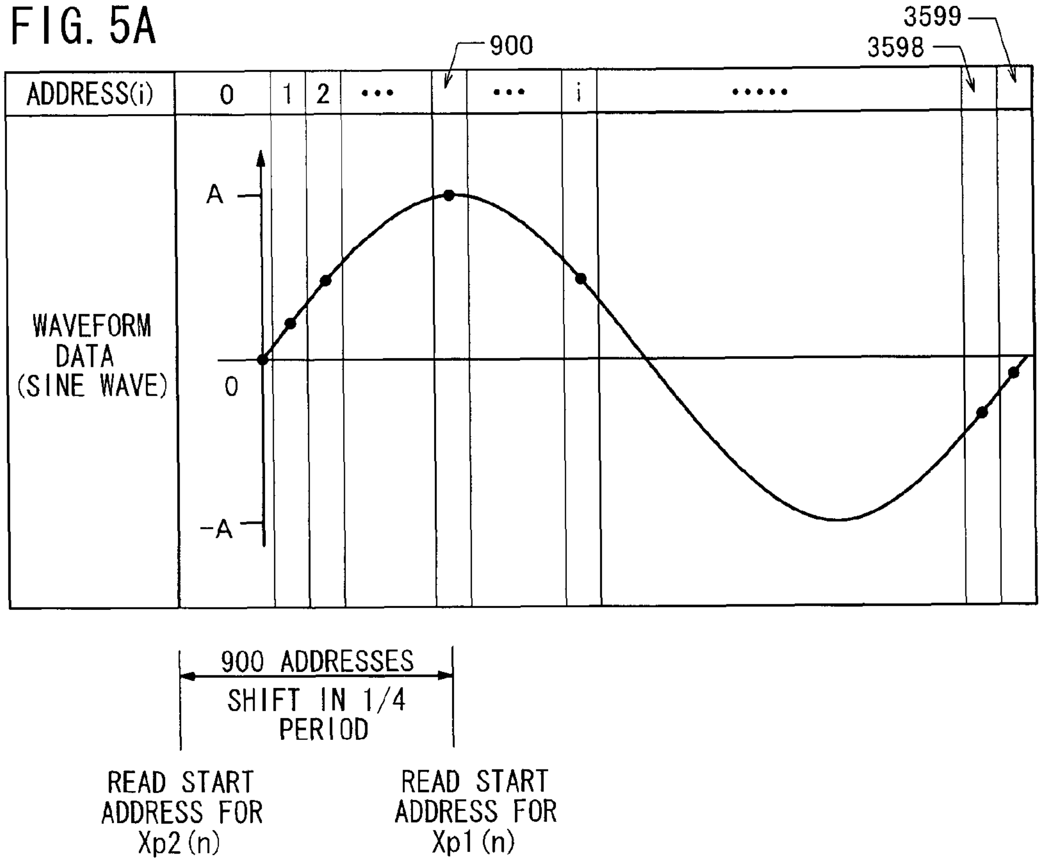
FIG. 5B
FIG. 5C
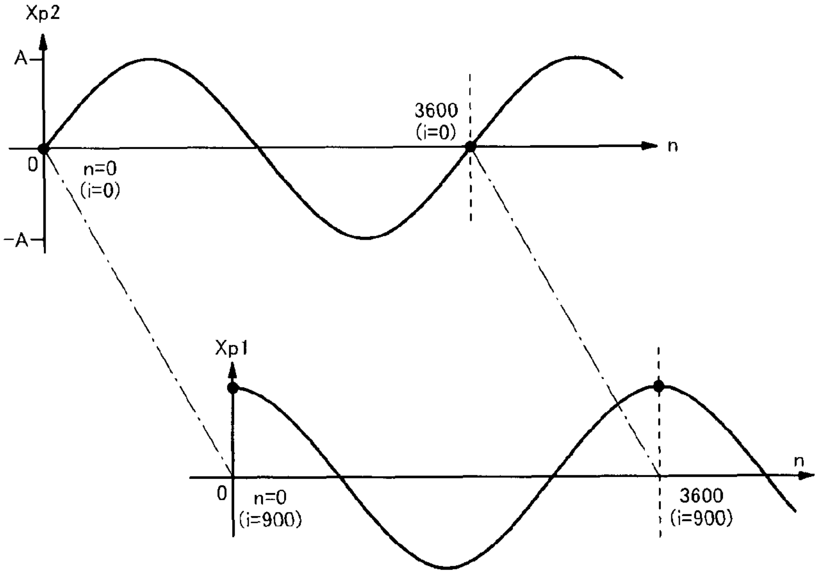

10C

VEHICULAR ACTIVE NOISE CONTROL SYSTEM

BACKGROUND OF THE INVENTION

1. Field of the Invention

The present invention relates to an active noise control system for reducing an in-compartment noise caused by a vibratory noise generated by a vibratory noise source on a vehicle with a canceling sound that is in opposite phase with the in-compartment noise.

2. Description of the Related Art

Heretofore, there has been known the technology of an active noise control apparatus for reducing an in-compartment noise at the position of a microphone placed in the passenger compartment of a vehicle, by detecting the in-compartment noise with the microphone and outputting, from a speaker placed in the passenger compartment, a canceling sound that is in opposite phase with the in-compartment noise based on the in-compartment noise and an engine rotation signal which is correlated to the vibratory noise of an engine on the vehicle (see Japanese Laid-Open Patent Publication No. 2006-084532 and Japanese Patent No. 3843082). The active noise control apparatus cancels out a noise (hereinafter also referred to as "engine noise" or "engine muffling sound") in the passenger compartment which is caused by the vibratory noise of the engine, of the in-compartment noise.

The in-compartment noise also includes, in addition to the engine noise, a noise (hereinafter also referred to as "driveline noise") in the passenger compartment that is caused by a vibratory noise of a rotating driveline component such as a propeller shaft, a drive shaft, or the like while the vehicle is running. According to Japanese Laid-Open Utility Model Publication No. 62-200034, it has been proposed to provide a torsional damper around a propeller shaft for dampening torsional vibrations of the propeller shaft thereby to reduce the noise generated by the differential.

The noise is generated by the differential because the propeller shaft which is relatively long and heavy is not well balanced upon rotation. The torsional damper disposed around the propeller shaft for reducing the noise makes the vehicle heavy as a whole and also makes the vehicle costly to manufacture. Alternatively, instead of the torsional damper, weights may be added to vibration-causing regions of the driveline, or production-induced variations of the components of the driveline may be strictly controlled, to reduce the driveline noise. These countermeasures, however, are still liable to make the vehicle heavy as a whole and also to make the vehicle costly to manufacture.

Attempts have been made to reduce the driveline noise with the active noise control apparatus described above. However, since the active noise control apparatus is based on the fact that the engine noise is generated in synchronism with the rotation of the output shaft of the engine, and generates the canceling sound using the frequency of the engine rotation signal depending on the rotational speed of the output shaft, the active noise control apparatus cannot directly be applied to reduce the driveline noise.

This is because the engine is occasionally disconnected from a transmission by a lockup control function of an automatic transmission vehicle or a clutch function of a manual transmission vehicle, making it difficult to calculate the rotational speed and rotation frequency of a driveline component such as a drive shaft, a propeller shaft, or the like at all times from the rotational speed of the output shaft of the engine. Therefore, even if the canceling sound is generated using the frequency of the engine rotation signal, it is difficult to reduce the noise in the passenger compartment (driveline noise) due to the vibratory noise of the driveline.

SUMMARY OF THE INVENTION

It is an object of the present invention to provide a vehicular active noise control system which is capable of reliably canceling out a driveline noise.

Another object of the present invention is to provide a vehicular active noise control system which is capable of making a vehicle that incorporates the vehicular active noise control system lower in weight and cost.

A vehicular active noise control system according to the present invention comprises a basic signal generator for generating a basic signal having a predetermined control frequency based on a frequency of a vibratory noise generated by a vibratory noise source of a vehicle, an adaptive filter for generating a control signal to cancel out an in-compartment noise produced in a passenger compartment of the vehicle by the vibratory noise, based on the basic signal, and a sound outputting device for outputting a canceling sound based on the control signal into the passenger compartment. The present invention further comprises an error signal detector for detecting a canceling error sound between the in-compartment noise and the canceling sound and outputting an error signal representing the detected canceling error sound, a reference signal generator for correcting the basic signal based on a corrective value representing transfer characteristics from the sound outputting device to the error signal detector corresponding to the control frequency, and outputting the corrected basic signal as a reference signal, and a filter coefficient updating unit for sequentially updating a filter coefficient of the adaptive filter to minimize the error signal, based on the error signal and the reference signal.

The vehicular active noise control system also includes a vehicle speed detector for detecting a vehicle speed of the vehicle and outputting a vehicle speed signal representing the detected vehicle speed, and a frequency calculating unit for calculating the control frequency which is a harmonic of a rotation frequency of a driveline rotary component of the vehicle which serves as the vibratory noise source, based on the vehicle speed signal, and outputting the calculated control frequency to the basic signal generator. The basic signal generator has a waveform data table for storing waveform data in one cyclic period, and generates the basic signal having the control frequency by successively reading the waveform data from the waveform data table at each sampling event.

The vehicular active noise control system also includes an engine rotational speed detector for detecting an engine rotational speed of an engine of the vehicle, and a frequency calculating unit for calculating the control frequency which is a harmonic of a rotation frequency of a driveline rotary component of the vehicle which serves as the vibratory noise source, based on the engine rotational speed, and outputting the calculated control frequency to the basic signal generator. The basic signal generator has a waveform data table for storing waveform data in one cyclic period, and generates the basic signal having the control frequency by successively reading the waveform data from the waveform data table at each sampling event.

With the above arrangements, the rotation frequency of the driveline rotary component is estimated from the engine rotational speed or the vehicle speed signal, the basic signal is generated which has the control frequency that is a harmonic of the rotation frequency, and the control signal is generated from the basic signal. Since the in-compartment noise produced in the passenger compartment due to the vibratory noise of the driveline rotary component is a driveline noise having a frequency that is a harmonic of the frequency of the vibratory noise, when the canceling sound based on the control signal is output from the sound outputting device into the passenger compartment, the driveline noise at the position of the error signal detector is reliably silenced.

As the driveline noise is silenced without the need for torsional dampers and weights, the vehicle as a whole can be reduced in weight and cost.

The driveline comprises an overall power transmitting mechanism from a clutch or a torque converter connected to the output shaft of the engine to tires of the vehicle. More specifically, the driveline includes a transmission, a propeller shaft, a differential, a drive shaft, and wheels, for example. The driveline rotary component refers to a component of the driveline which is rotatable when the vehicle is in operation, and includes the propeller shaft, the drive shaft, and tires, for example.

In the above system, the vehicle speed detector detects the rotational speed of a countershaft or the like of the vehicle, and outputs a pulse signal depending on the detected rotational speed as the vehicle speed signal to the frequency calculating unit.

Since the frequency calculating unit calculates the control frequency using the vehicle speed signal, the system can easily generate the control signal for canceling out the driveline noise.

The rotation frequency is estimated from the engine rotational speed as follows:

If the driveline rotary component comprises the propeller shaft, then the frequency calculating unit should preferably calculate the rotation frequency of the propeller shaft by multiplying a frequency depending on the engine rotational speed by a transmission gear ratio, a final gear ratio, a bevel gear ratio, and a transfer gear ratio.

In this manner, the frequency calculating unit can easily calculate the rotation frequency of the propeller shaft from the engine rotational speed.

The transmission gear ratio represents a gear ratio between a gear mounted on a main shaft of the transmission and a gear mounted on a countershaft. The final gear ratio represents a gear ratio between another gear mounted on the countershaft and a gear mounted on the drive shaft. The bevel gear ratio represents a gear ratio between a bevel gear mounted on the drive shaft and a bevel gear on the side of the propeller shaft which is held in mesh with the first-mentioned bevel gear within the differential. The transfer gear ratio represents a gear ratio between another gear mounted on a shaft which supports the bevel gear on the side of the propeller shaft and a gear mounted on the propeller shaft.

If the driveline rotary component comprises the drive shaft or the tires, then the frequency calculating unit should preferably calculate the rotation frequency of the drive shaft or the tires by multiplying a frequency depending on the engine rotational speed by the transmission gear ratio or the final gear ratio.

In this manner, the frequency calculating unit can easily calculate the rotation frequency of the drive shaft or the tires from the engine rotational speed.

The vehicular active noise control system should preferably further comprise a connected state output unit for outputting a disconnection signal indicating that the engine and the transmission of the vehicle are disconnected from each other, to the frequency calculating unit, and the frequency calculating unit should preferably stop calculating the rotation frequency when the disconnection signal is input thereto.

Therefore, when the disconnection signal is input to the frequency calculating unit while the frequency calculating unit is calculating the rotation frequency based on the engine rotational speed, the frequency calculating unit can quickly stop calculating the rotation frequency based on the engine rotational speed.

Further, the rotation frequency is estimated from the vehicle speed signal as follows:

If the driveline rotary component comprises the propeller shaft, then the frequency calculating unit calculates the rotation frequency of the propeller shaft by multiplying the frequency of the vehicle speed signal by a predetermined conversion value for conversion between the rotational speed of the countershaft and the vehicle speed signal, the final gear ratio, the bevel gear ratio, and the transfer gear ratio.

If the driveline rotary component comprises the drive shaft or the tires, then the frequency calculating unit calculates the rotation frequency of the drive shaft or the tires by multiplying the frequency of the vehicle speed signal by a predetermined conversion value for conversion between the rotational speed of the countershaft and the vehicle speed signal, and the final gear ratio.

In this manner, the rotation frequency of the propeller shaft, the drive shaft, or the tires can easily be calculated from the vehicle speed signal.

The vehicular active noise control system should preferably further comprise engine rotational speed detector for detecting the engine rotational speed of an engine of the vehicle, and a connected state output unit for outputting a disconnection signal indicating that the engine and the transmission are disconnected from each other, to the frequency calculating unit, and the frequency calculating unit should preferably calculate the rotation frequency based on the vehicle speed signal or the engine rotational speed when the disconnection signal is not input thereto, and calculate the rotation frequency based on the vehicle speed signal when the disconnection signal is input thereto.

Consequently, the frequency calculating unit continuously calculates the rotation frequency even when the engine and the transmission are disconnected from each other while the frequency calculating unit is calculating the rotation frequency. When the disconnection signal is input to the frequency calculating unit while the frequency calculating unit is calculating the rotation frequency based on the engine rotational speed, the frequency calculating unit quickly changes to the calculation of the rotation frequency based on the vehicle speed signal.

If the control frequency is a frequency which is represented by a real multiple of the rotation frequency, then the system reliably silences the driveline noise even if the driveline noise has a frequency which is of a given degree with respect to the vibratory noise.

Preferably, the control signal comprises a first control signal for canceling out a driveline noise produced in the passenger compartment by the vibratory noise generated by the driveline rotary component, and the vehicular active noise control system further comprises an active noise control apparatus for generating a second control signal to cancel out an engine noise produced in the passenger compartment by an engine vibratory noise generated by an engine of the vehicle which serves as the vibratory noise source, based on the engine vibratory noise, and a signal combining unit for combining the first control signal and the second control signal into a combined signal, and outputting the combined signal to the sound outputting device.

With the above arrangement, the in-compartment noise (the engine noise and the driveline noise) at the position of the error signal detector can well be silenced.

The vehicular active noise control system should preferably further comprise a comparing and adjusting unit for comparing a control frequency of the first control signal and a control frequency of the second control signal with each other, and stopping outputting one of the first and second control signals to the signal combining unit or changing an output level of one of the first and second control signals if the control frequencies of the first and second control signals are the same as or close to each other.

If the control frequencies are the same as each other, then the in-compartment noise is silenced using one of the control signals. If the control frequencies are close to each other, then a canceling sound based on one of the control signals which has a relatively large output level is output to cancel a noise which has the same frequency as the control frequency of the control signal having the relatively large output level, and a canceling sound based on the other control signal is output to reduce a noise which has a frequency close to the control frequency of the control signal having the relatively large output level. The comparing and adjusting unit makes it possible for the system to silence the in-compartment noise efficiently.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 5A through 5C are diagrams showing the manner in which the data are read from the waveform data table shown in FIG. 3;

DESCRIPTION OF THE PREFERRED EMBODIMENTS

Figure 1:
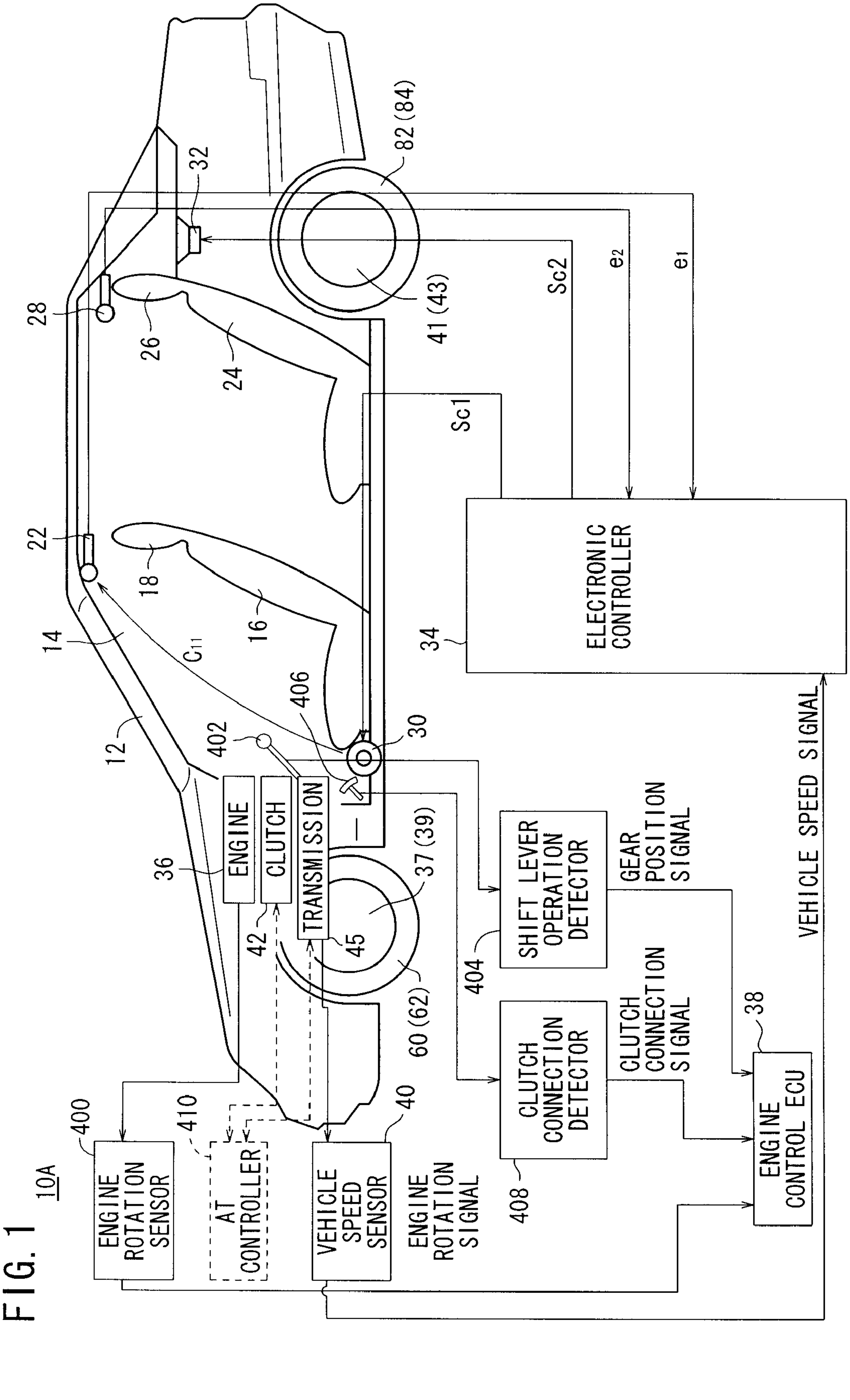
FIG. 1 is a side elevational view, partly in block form, of a vehicle incorporating a vehicular active noise control system according to a first embodiment of the present invention.

Like or corresponding parts are denoted by like or corresponding reference characters throughout views.

Figure 2:
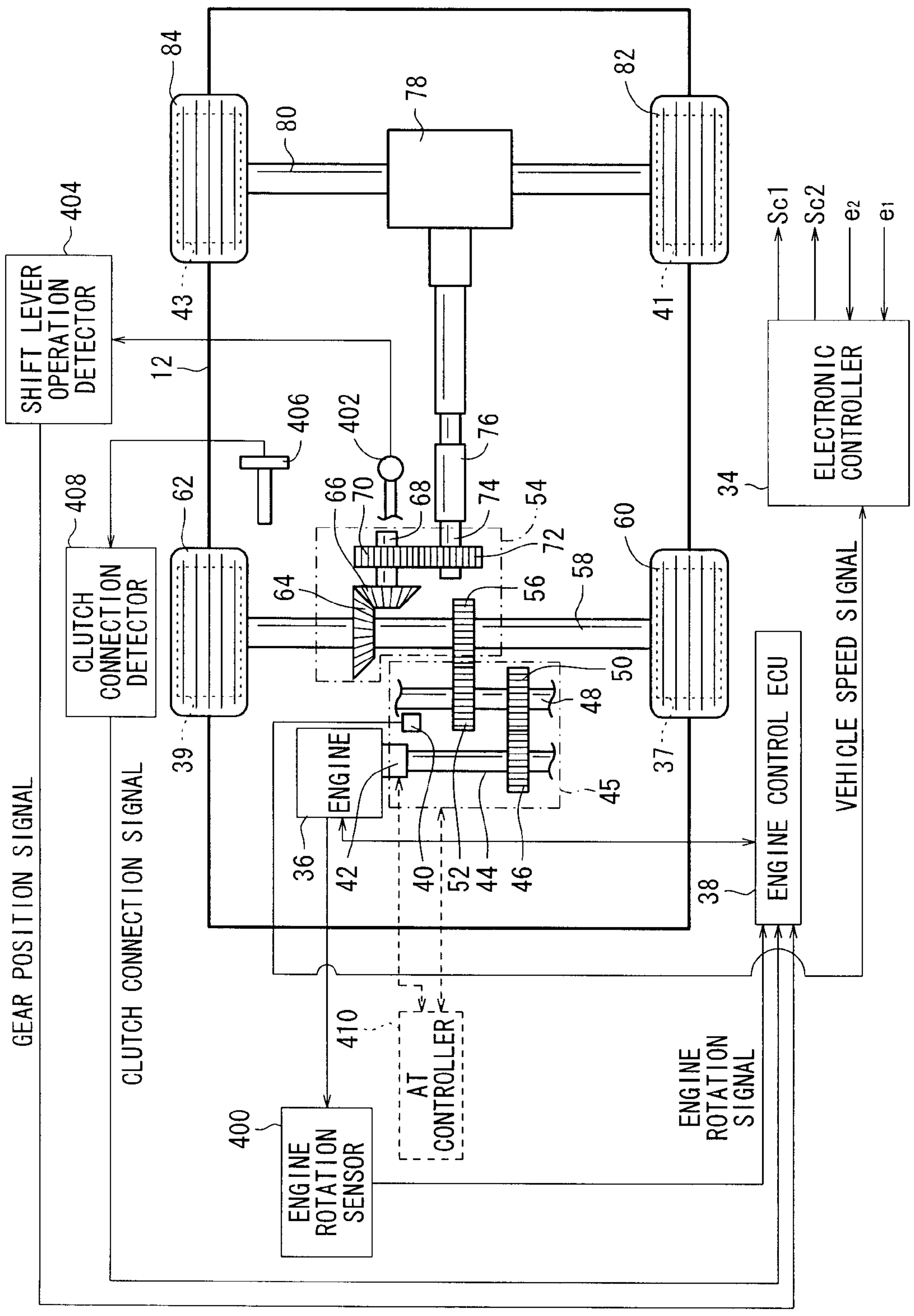
FIG. 2 is a schematic plan view showing a driveline of the vehicle shown in FIG. 1.

FIGS. 1 and 2 show in block form a vehicular active noise control system (hereinafter referred to as "system") 10A according to a first embodiment of the present invention, which is incorporated in a vehicle 12. In FIG. 2, the vehicle 12 is shown as a 4WD (AWD) vehicle.

The system 10A comprises a microphone 22 disposed on a roof lining of the vehicle 12 near the head rest 18 of a front seat 16 in a passenger compartment 14, or specifically near the position of an ear of a passenger, not shown, seated on the front seat 16, a microphone 28 disposed near the head rest 26 of a rear seat 24, a speaker 30 mounted on a door near the front seat 16, a speaker 32 disposed behind the rear seat 24, and an electronic controller 34.

The vehicle 12 has an engine 36 that is controlled by an engine control ECU 38. The engine control ECU 38 is supplied with an engine rotation signal from an engine rotation sensor (engine rotational speed detector) 400. The engine rotation signal is made up of engine rotation pulses that are output from the engine rotation sensor 400 in synchronism with the rotation of the output shaft of the engine 36, and is correlated to a noise generated by the engine 36 (e.g., an engine sound and a periodic noise caused by vibratory forces produced upon rotation of the output shaft of the engine 36) and a vibratory noise representative of vibrations etc. of the engine 36.

The engine control ECU 38 is also supplied with a gear position signal from a shift lever operation detector 404. The gear position signal represents a transmission gear ratio of a transmission 45 depending on the operation by the passenger of a shift lever 402 if the vehicle 12 is a manual transmission vehicle. The engine control ECU 38 is also supplied with a clutch connection signal (disengagement signal) from a clutch connection detector (connected state output unit) 408. The clutch signal represents a disengagement of a clutch 42 to disconnect the transmission 45 from the engine 36 when the passenger presses a clutch pedal 406. The transmission gear ratio represents a gear ratio between a transmission gear 46 mounted on a main shaft 44 and a transmission gear 50 mounted on a countershaft 48 and held in mesh with the transmission gear 46 in the transmission 45 as shown in FIG. 2.

In the description which follows, it is assumed that the vehicle 12 is a manual transmission vehicle. However, if the vehicle 12 is an automatic transmission vehicle, then the clutch 42 is replaced with a torque converter, and when the transmission 45 is disconnected from the engine 36 by the torque converter, an automatic transmission (AT) controller (connected state detector) 410 (shown by the broken lines in FIGS. 1 and 2) for controlling the torque converter and the transmission 45 generates a clutch connection signal (disengagement signal) indicating that the transmission 45 is disconnected from the engine 36. The AT controller 410 also generates a gear position signal representative of the transmission gear ratio of the transmission 45.

As shown in FIG. 2, the vehicle 12 has a driveline comprising a power transmitting mechanism from the clutch 42 connected to the output shaft of the engine 36 to tires 60, 62, 82, 84. More specifically, the driveline includes the clutch 42, the main shaft 44, the countershaft 48, the transmission gears 46, 50, and a final gear 52 of the transmission 45, a final gear 56, bevel gears 64, 66, transfer gears 70, 72, and shafts 68, 74 of a front differential 54, a drive shaft 58, a propeller shaft 76, a rear differential 78, a drive shaft 80, wheels 37, 39, 41, 43, and the tires 60, 62, 82, 84.

When the vehicle 12 is in operation, the driveline produces a vibratory noise upon rotation of driveline rotary components including the propeller shaft 76, the drive shaft 58, the tires 60, 62, 82, 84, etc., and a driveline noise having harmonics of the frequency of the vibratory noise is generated in the passenger compartment 14 (see FIG. 1) due to the vibratory noise. The components per se of the driveline are well known in the art, and will not be described in detail below.

A vehicle speed sensor (vehicle speed detector) 40 is disposed near the countershaft 48. The vehicle speed sensor 40 supplies a vehicle speed signal (vehicle speed pulses) representing the vehicle speed of the vehicle 12 depending on the rotational speed of the countershaft 48, to the electronic controller 34. At this time, the vehicle speed sensor 40 converts countershaft pulses depending on the rotational speed of the countershaft 48 into the vehicle speed pulses using a predetermined statutory conversion value α for displaying a vehicle speed on a vehicle speedometer, not shown, and outputs the vehicle speed pulses to the electronic controller 34.

The conversion value α is 0.8529, for example, indicating that the vehicle speed sensor 40 generates one vehicle speed pulse when the countershaft 48 makes a 0.8529 revolution. The conversion value α may be 1, so that the vehicle speed sensor 40 generates one vehicle speed pulse when the countershaft 48 makes one revolution. In the description which follows, the conversion value α is set to 0.8529.

Based on the vehicle speed signal, the electronic controller 34 generates control signals Sc1, Sc2 for canceling an in-compartment noise including the driveline noise, and outputs the control signals Sc1, Sc2 as canceling sounds to the speakers (sound outputting devices) 30, 32, which output canceling sounds based on the control signals Sc1, Sc2 into the passenger compartment 14. The microphones (error signal detectors) 22, 28 detect canceling error sounds between the in-compartment noises and the canceling sounds, and output error signals e1, e2 representing the detected canceling error sounds to the electronic controller 34.

Figure 3:
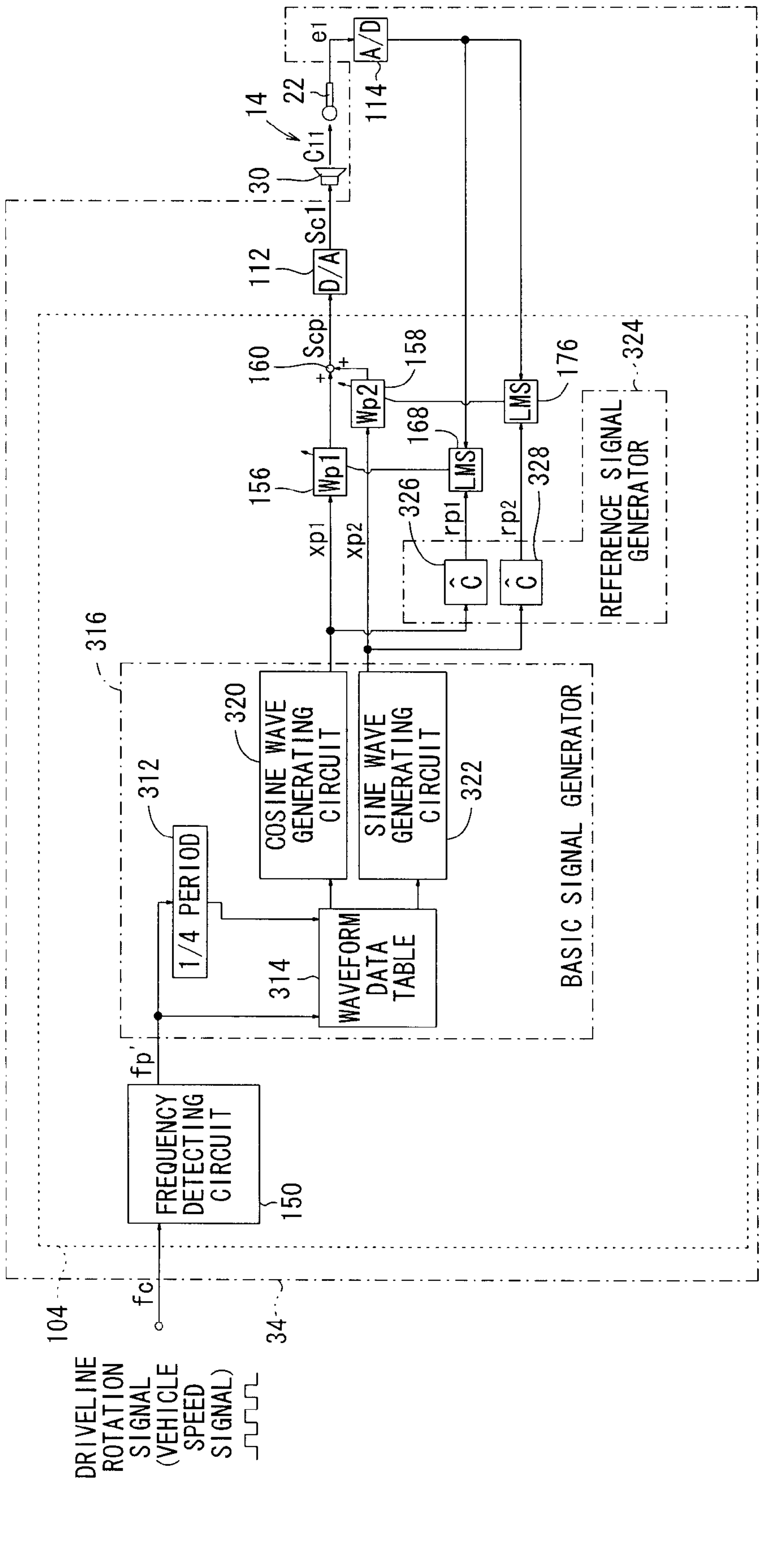
FIG. 3 is a functional block diagram of the vehicular active noise control system shown in FIG. 1.

FIG. 3 is a functional block diagram of the electronic controller 34. For an easier understanding of the present invention, it is assumed with respect to the electronic controller 34 shown in FIG. 3 that the in-compartment noise including the driveline noise at the position of the microphone 22 in the passenger compartment 14 is reduced using the microphone 22 and the speaker 30 near the front seat 16. The same assumption applies to all electronic controllers according to other embodiments of the present invention.

The electronic controller 34 is implemented by a microcomputer and has a control circuit 104 for generating a control signal Scp based on the vehicle speed signal, a D/A converter (hereinafter also referred to as "DAC") 112, and an A/D converter (hereinafter also referred to as "ADC") 114.

The control circuit 104 comprises a frequency detecting circuit (frequency calculating unit) 150, a basic signal generator 316, a reference signal generator 324, adaptive filters 156, 158, an adder 160, and filter coefficient updating units 168, 176.

The frequency detecting circuit 150 estimates the frequency (rotation frequency) fp of the propeller shaft 76 from the frequency fc of the vehicle speed pulses applied thereto.

A process of estimating the frequency fp from the frequency fc in the frequency detecting circuit 150 will be described below.

It is assumed that the gear ratio (final gear ratio) between the number Fr of teeth of the final gear 52 (see FIG. 2) and the number Fn of teeth of the final gear 56 is represented by Fr/Fn, the gear ratio (bevel gear ratio) between the number Br of teeth of the bevel gear 64 and the number Bn of teeth of the bevel gear 66 by Br/Bn, and the gear ratio (transfer gear ratio) between the number Tr of teeth of the transfer gear 70 and the number Tn of teeth of the transfer gear 72 by Tr/Tn. The frequency detecting circuit 150 calculates (estimates) the frequency fp from the frequency fc according to the following equation (1):

$$fp = fc \times \alpha \times (Fr/Fn) \times (Br/Bn) \times (Tr/Tn) \tag{1}$$

For example, if fc=58.8 [Hz], (Fr/Fn)×(Br/Bn)×(Tr/Tn)=0.629764, then fp=37 [Hz].

According to the above estimating process, since the gear ratio (transmission gear ratio) Hr/Hn between the number Hr of teeth of the transmission gear 46 and the number Hn of teeth of the transmission gear 50 is not included in the equation (1), the frequency detecting circuit 150 can calculate the frequency fp from the frequency fc using the vehicle speed signal regardless of the connected state between the engine 36 and the transmission 45, i.e., regardless of whether the engine 36 and the transmission 45 are connected or not.

The frequency detecting circuit 150 then calculates a control frequency fp' which is a harmonic (e.g., a first harmonic represented by a real multiple) of the frequency fp, from the frequency fp of the propeller shaft 76 estimated according to the equation (1), and outputs the calculated control frequency fp' to the basic signal generator 316.

The frequency detecting circuit 150 also generates a timing signal (sampling pulses) having a sampling period of the microcomputer (the control circuit 104), and the microcomputer performs a processing operation according to an LMS algorithm, to be described later, based on the timing signal generated by the frequency detecting circuit 150.

The basic signal generator 316 comprises an address shifter 312, a waveform data table 314 as a memory, a cosine wave generating circuit 320, and a sine wave generating circuit 322. Based on waveform data in one cyclic period stored in the waveform data table 314, the basic signal generator 316 generates basic signals (a basic cosine wave signal xp1 and a basic sine wave signal xp2) having the control frequency fp', and outputs the generated basic signals to the adaptive filters 156, 158 and the reference signal generator 324.

Figures 4A, 4B:
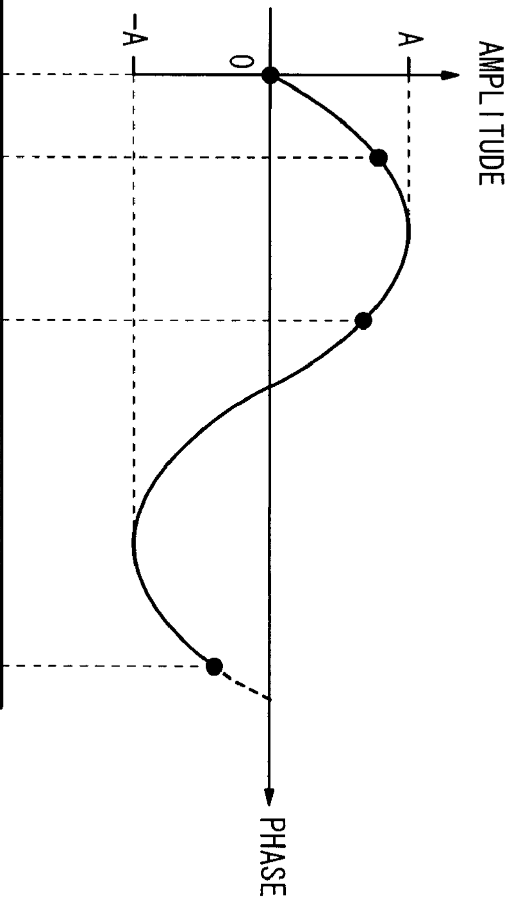
FIGS. 4A and 4B are diagrams showing specific data stored in a waveform data table shown in FIG. 3.

As shown in FIGS. 4A and 4B, the waveform data table 314 stores instantaneous value data as waveform data at respective addresses, the instantaneous value data representing a predetermined number (N) of instantaneous values into which the waveform of a sine wave in one cyclic period is divided at equal intervals along a time axis {the phase axis in FIG. 4B}. The addresses (i) are indicated by integers (i=0, 1, 2, . . . , N−1) ranging from 0 to (the predetermined number−1). An amplitude value A shown in FIGS. 4A and 4B are represented by 1 or any desired positive real number. Therefore, the waveform data at the address i is calculated as A·sin(360°×i/N). Stated otherwise, one cycle of sine waveform is divided into N sampled values at sampling points spaced over time, and data generated by quantizing the instantaneous values of the sine wave at the respective sampling points are stored as waveform data at respective addresses, which are represented by the respective sampling points, in the waveform data table 314 (see FIG. 3).

Addresses based on the control frequency fp' from the frequency detecting circuit 150 are specified for the sine wave generating circuit 322 to access the waveform data table 314, and addresses produced when the address shifter 312 shifts the above addresses based on the control frequency fp' by a ¼ period are specified for the cosine wave generating circuit 320 to access the waveform data table 314.

FIGS. 5A through 5C schematically illustrate the manner in which the basic signal generator 316 (see FIG. 3) generates the basic signals (the basic cosine wave signal xp1 and the basic sine wave signal xp2). A process of generating the basic cosine wave signal xp1 with the cosine wave generating circuit 320 and a process of generating the basic sine wave signal xp2 with the sine wave generating circuit 322 will be described in specific detail below with reference to FIGS. 3 through 5C.

In FIGS. 5A through 5C, n refers to an integer of 0 or greater, and represents a count of sampling pulses (timing signal count). FIG. 5A schematically shows the relationship between the addresses and the waveform data of the waveform data table 314 (see FIG. 3). FIG. 5B schematically shows the generation of the basic sine wave signal xp2, and FIG. 5C shows the generation of the basic cosine wave signal xp1.

The frequency detecting circuit 150 outputs a timing signal at a fixed sampling period according to a fixed sampling process. The predetermined number (N) is assumed to be 3600. The addresses are i=0, 1, 2, . . . , N−1=0, 1, 2, . . . , 3599, and the shift for the ¼ period is represented by N/4=900. For the sake of brevity, the sampling interval (time) is set to t=1/N=1/3600 [s].

Since the sampling interval is 1/3600 [s] (1/N [s]), each time a sampling pulse is input from the frequency detecting circuit 150, a read address i(n) for the waveform data table 314 is specified at an address interval "is" based on the control frequency fp' according to the following equation (2):

$$\begin{aligned}\text{Address interval: is} &= N \times fp' \times t = \\ &= 3600 \times fp' \times (1/3600) \\ &= fp'\end{aligned} \tag{2}$$

Therefore, the address i(n) at a certain timing is given according to the following equation (3):

$$i(n)=i(n-1)+is=i(n-1)+fp' \tag{3}$$

If i(n)>3599 (=N−1), the address i(n) at a certain timing is given according to the following equation (4):

$$i(n)=i(n-1)+fp'-3600 \tag{4}$$

The sine wave generating circuit 322 (see FIG. 3) generates a basic sine wave signal xp2(n) by reading waveform data from the waveform data table 314 at the address interval "is" corresponding to the control frequency fp' each time a sampling pulse is generated by the frequency detecting circuit 150. For example, if the control frequency fp' is 40 [Hz], then when the control process has started, the sine wave generating circuit 322 generates a basic sine wave signal xp2(n) of 40 [Hz] by reading waveform data from the addresses i(n)=0, 40, 80, 120, . . . , 3560, 0, . . . in response to each sampling pulse from the frequency detecting circuit 150, i.e., at each interval of 1/3600 [s].

The address shifter 312 (see FIG. 3) produces addresses by shifting (adding) the read addresses i(n) for the basic sine wave signal xp2(n) by a ¼ period based on sin(θ+π/2)=cos θ, according to the equation (5) shown below, and specifies the produced addresses as read addresses i'(n) for the cosine wave generating circuit 320 to access the waveform data table 314.

$$i'(n)=i(n)+N/4=i(n)+900 \tag{5}$$

If i'(n)>3599 (=N−1), the addresses i'(n) are given according to the following equation (6):

$$i'(n)=i(n)+900-3600 \tag{6}$$

Therefore, the cosine wave generating circuit 320 generates a basic cosine wave signal xp1(n) by reading waveform data from the waveform data table 314 at the address interval "is" corresponding to the control frequency fp' each time a sampling pulse is generated by the frequency detecting circuit 150, based on the addresses i'(n) produced by shifting the read addresses i(n) for the reference sine wave signal xp2(n) by the ¼ period.

For example, if the control frequency fp' is 40 [Hz], then when the control process has started, the cosine wave generating circuit 320 generates a basic cosine wave signal xp1(n) of 40 [Hz] by reading waveform data from the addresses i'(n)=900, 940, 980, 1020, . . . , 860, 900, . . . in response to each sampling pulse from the frequency detecting circuit 150, i.e., at each interval of 1/3600 [s].

According to the fixed sampling process, as described above, the basic signals {the basic cosine wave signal xp1(n) and the basic sine wave signal xp2(n)} are generated by changing the read address interval for the waveform data depending on the control frequency fp'.

If the frequency detecting circuit 150 outputs a timing signal at a sampling period in synchronism with the rotational speed of the propeller shaft 76 (see FIG. 2), i.e., the rotational speed based on vehicle speed pulses (variable sampling process), then the basic signals {the basic cosine wave signal xp1(n) and the basic sine wave signal xp2(n)} can be generated by changing the value of the predetermined number (N) and the sampling period in synchronism with the rotational speed of the propeller shaft 76, according to the process of generating a basic signal based on the synchronous sampling process as disclosed in Japanese Laid-Open Patent Publication No. 2006-084532 (variable sampling process) and also the above fixed sampling process.

The basic cosine wave signal xp1 and the basic sine wave signal xp2 thus generated are basic signals having a harmonic frequency of the frequency fp of the propeller shaft 76. The control frequency fp' which is a harmonic frequency corresponds to the frequency of the driveline noise that is generated in the passenger compartment 14 due to the vibratory noise of the propeller shaft 76.

The adaptive filter 156 corrects the basic cosine wave signal xp1 with a filter coefficient Wp1, and outputs a corrected basic cosine wave signal xp1·Wp1 to the adder 160. The adaptive filter 158 corrects the basic sine wave signal xp2 with a filter coefficient Wp2, and outputs a corrected basic sine wave signal xp2·Wp2 to the adder 160. The adder 160 adds the signal xp1·Wp1 from the adaptive filter 156 and the signal xp2·Wp2 from the adaptive filter 158 into a control signal Scp for canceling out the driveline noise in the passenger compartment 14 which is caused due to the vibratory noise produced upon rotation of the propeller shaft 76 (see FIG. 2).

The control signal Scp is converted from a digital signal into an analog signal by the DAC 112. The analog control signal Scp (Sc1) is supplied to the speaker 30, which outputs a canceling sound based on the control signal Scp into the passenger compartment 14. The microphone 22 detects a canceling error sound between the in-compartment noise including the driveline noise at the position of the microphone 22 and the canceling sound, and outputs an error signal e1 based on the detected canceling error sound. The error signal e1 is converted from an analog signal into a digital signal by the ADC 114. The digital error signal e1 is output to the filter coefficient updating units 168, 176.

The reference signal generator 324 comprises correctors 326, 328 each having a corrective value C representative of signal transfer characteristics C11 from the speaker 30 (see FIGS. 1 and 3) to the microphone 22. The correctors 326, 328 correct the respective basic signals xp1, xp2 with the corrective value $\hat{C}$, thereby generating respective reference signals rp1, rp2, and output the reference signals rp1, rp2 to the filter coefficient updating units 168, 176.

Figure 6:
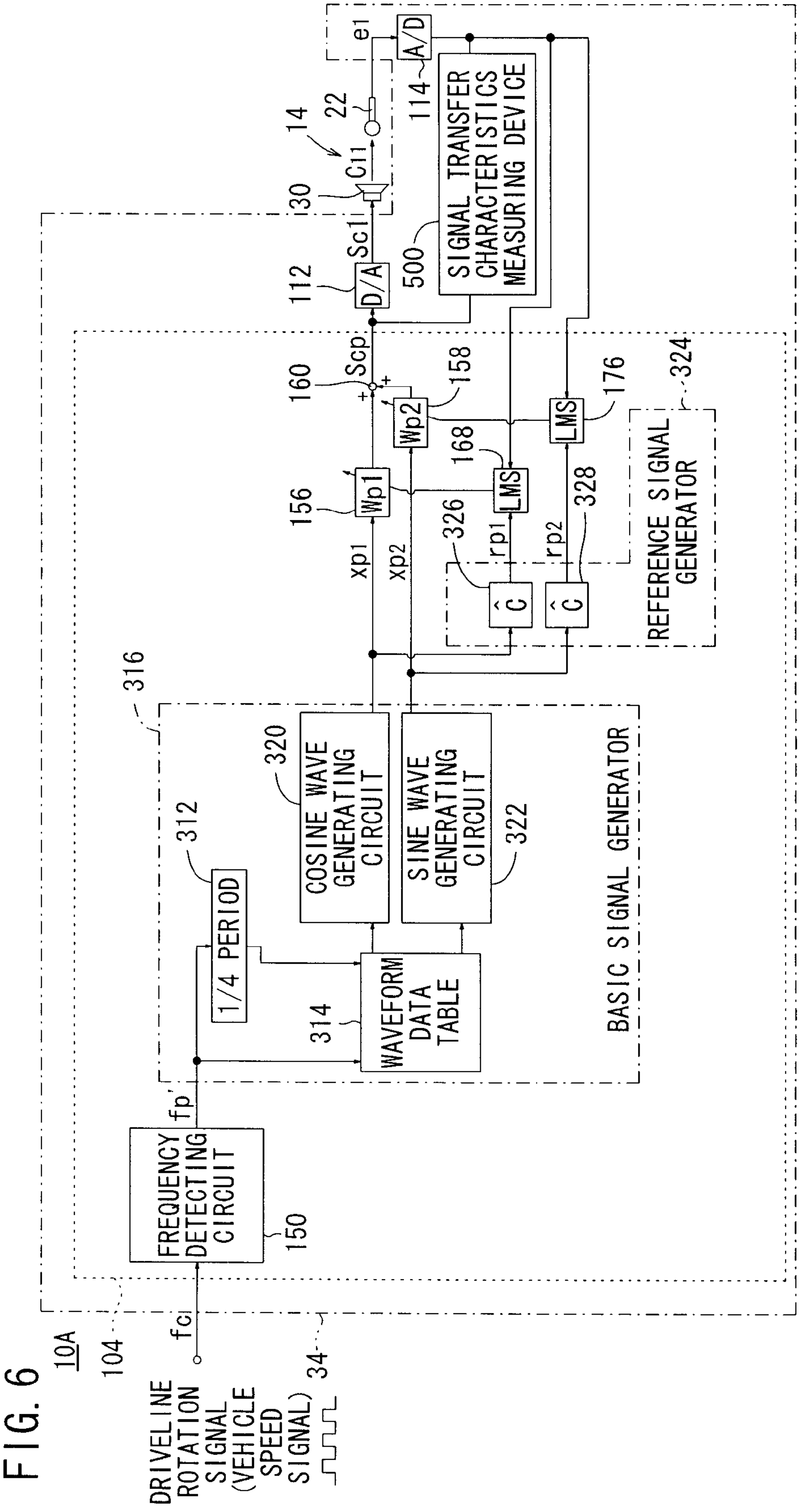
FIG. 6 is a functional block diagram of the vehicular active noise control system shown in FIG. 3, with a signal transfer characteristics measuring device disposed in an electronic controller.

The signal transfer characteristics are actually measured as follows. As shown in FIG. 6, a signal transfer characteristics measuring device 500 which comprises a Fourier transforming device is connected between the input terminal of the DAC 112 and the output terminal of the ADC 114. The signal transfer characteristics measuring device 500 measures signal transfer characteristics based on a test signal that is input from the adder 160 of the control circuit 104 to the DAC 112 and a signal output from ADC 114 to the filter coefficient updating units 168, 176 of the control circuit 104. In FIGS. 3 and 6, the signal transfer characteristics measured by the signal transfer characteristics measuring device 500 are set as the corrective value $\hat{C}$ in the correctors 326, 328 of the reference signal generator 324. Therefore, depending on how the signal transfer characteristics measuring device 500 measures signal transfer characteristics, the corrective value $\hat{C}$ may represent the signal transfer characteristics from the speaker 30 to the microphone 22 or the signal transfer characteristics from the output terminal of the adder 160 to the input terminals of the input terminals of the filter coefficient updating units 168, 176, including the signal transfer characteristics from the speaker 30 to the microphone 22, measured as described above.

The filter coefficient updating units 168, 176 (see FIGS. 3 and 6), which comprise least mean square (LMS) algorithm operators, perform an adaptive arithmetic process for adaptively calculating the filter coefficients Wp1, Wp2 based on the reference signals rp1, rp2 and the error signal e1, i.e., an arithmetic process for calculating the filter coefficients Wp1, Wp2 according to the least mean square method in order to minimize the error signal e1, and successively update the filter coefficients Wp1, Wp2 based on the calculated results in response to each sampling pulse.

As described above, the system 10A according to the first embodiment estimates the (rotation) frequency fp of the propeller shaft 76 as a driveline rotary component from the frequency fc of vehicle speed pulses, generates the basic signals (the basic cosine wave signal xp1 and the basic sine wave signal xp2) having the control frequency fp' which is a harmonic of the frequency fp, and generates the control signal Scp (Sc1) from the basic signals. Since the noise generated in the passenger compartment 14 due to the vibratory noise produced upon rotation of the propeller shaft 76 is a driveline noise having a harmonic frequency of the frequency of the vibratory noise, when the speaker 30 outputs a canceling sound based on the control signal Scp into the passenger compartment 14, the driveline noise at the position of the microphone 22 can reliably be canceled out.

Since the driveline noise is silenced without the need for torsional dampers and weights, the vehicle 12 as a whole can be reduced in weight and cost.

The frequency detecting circuit 150 calculates the frequency fp and the control frequency fp' using the frequency fc of vehicle speed pulses. Consequently, the system 10A can easily generate the control signal Scp for canceling out the driveline noise.

As the frequency detecting circuit 150 calculates the frequency fp of the propeller shaft 76 from the frequency fc of vehicle speed pulses according to the equation (1), the frequency detecting circuit 150 can easily calculate the frequency fp of the propeller shaft 76 from the vehicle speed pulses.

Since the control frequency fp' is a real-multiple harmonic frequency of the frequency fp, the system 10A can reliably silence a driveline noise which may have been generated in the passenger compartment 14 at a frequency of a given degree with respect to the vibratory noise.

A system 10B according to a second embodiment of the present invention will be described below with reference to FIGS. 7 through 9. Those parts of the system 10B which are identical to the system 10A according to the first embodiment (see FIGS. 1 through 6) are denoted by identical reference characters, and will not be described in detail below.

In the system 10B, the electronic controller 34 is not supplied with the vehicle speed signal, but with the engine rotation signal, the gear position signal, and the clutch connection signal from the engine control ECU 38. Based on the engine rotation signal, the gear position signal, and the clutch connection signal, the electronic controller 34 generates control signals Sc1, Sc2. The electronic controller 34 has a switch 300 and a switch controller 302.

Figure 7:
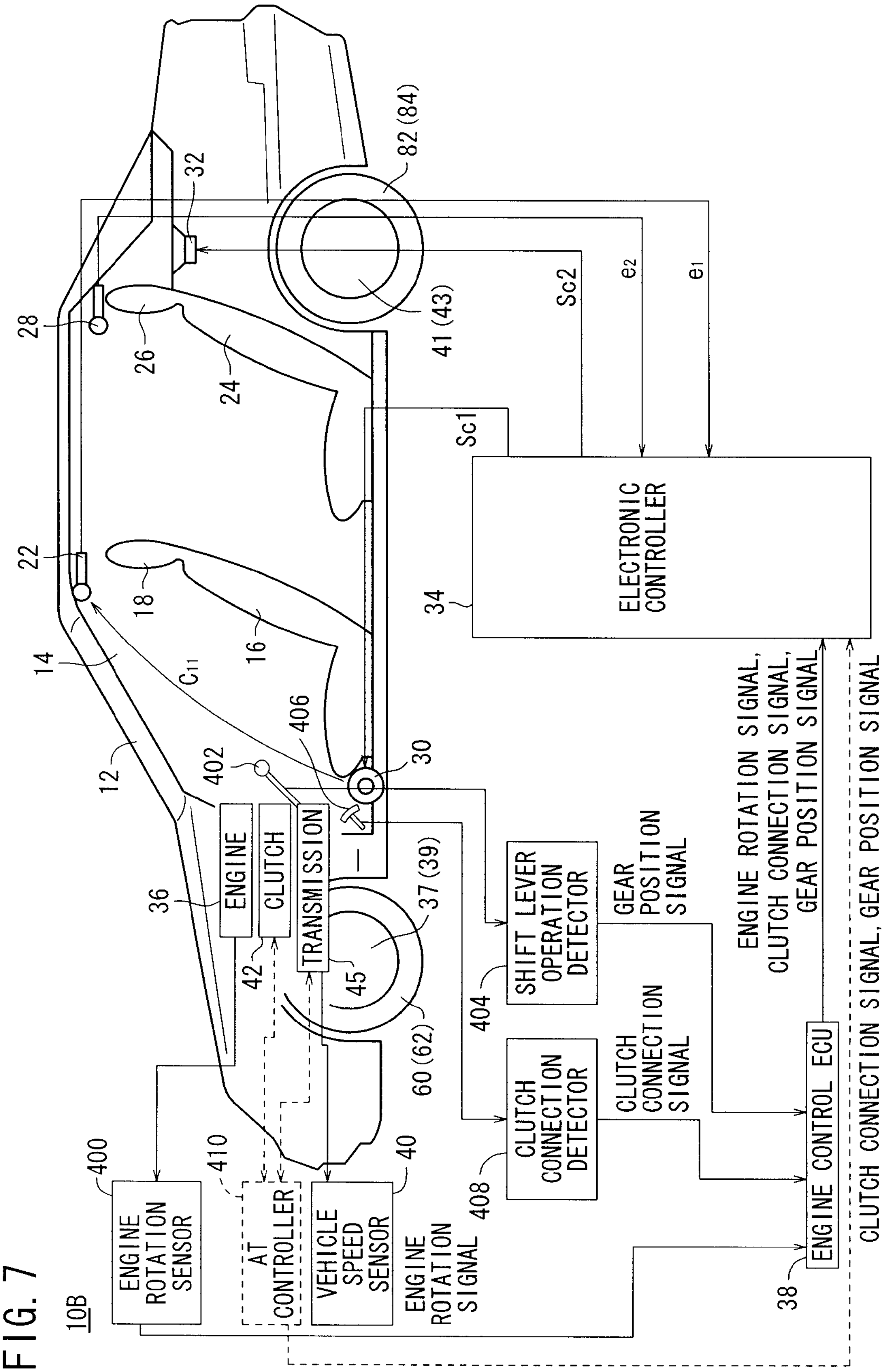
FIG. 7 is a side elevational view, partly in block form, of a vehicle incorporating a vehicular active noise control system according to a second embodiment of the present invention.
Figure 8:
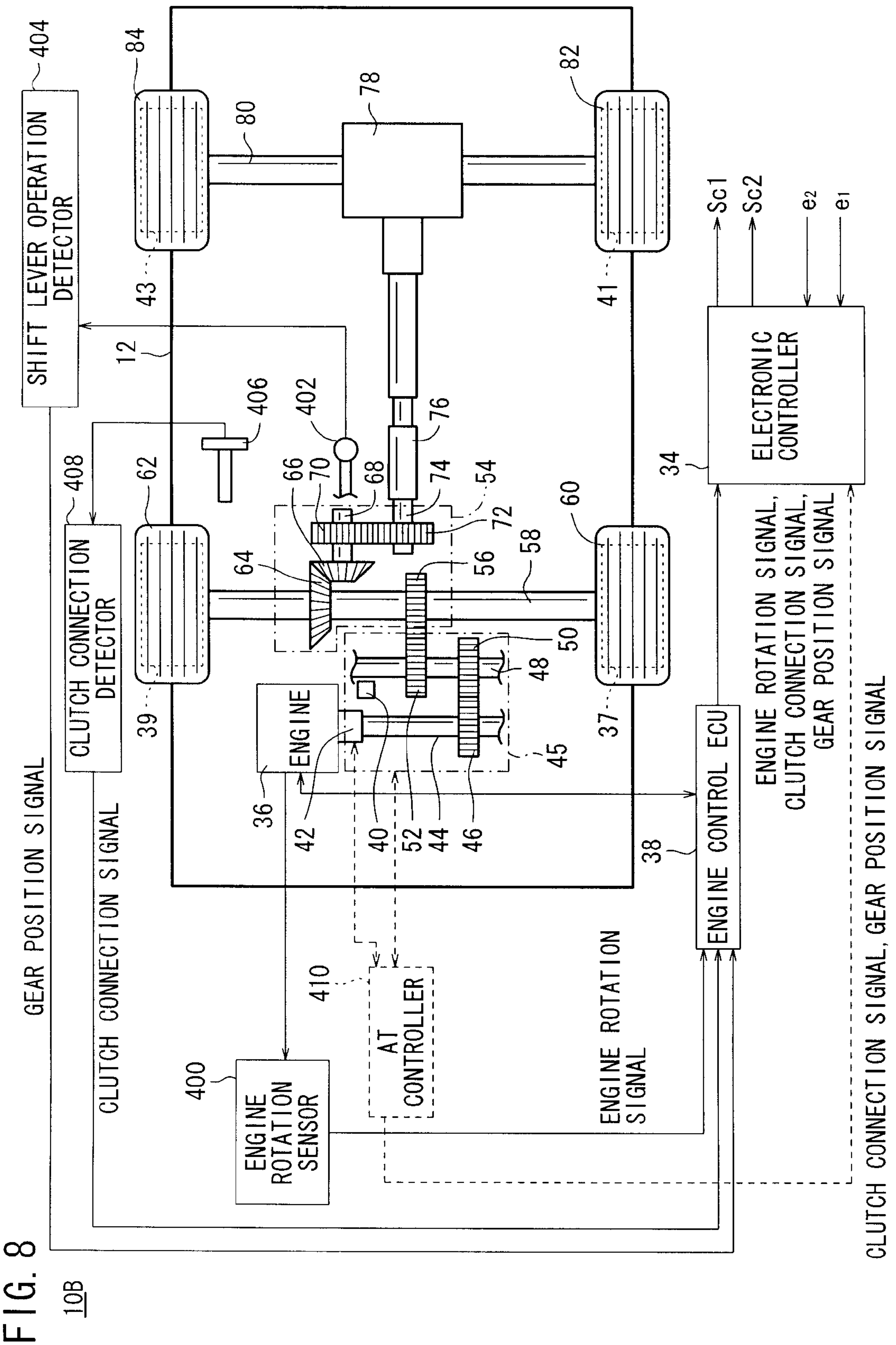
FIG. 8 is a schematic plan view showing a driveline of the vehicle shown in FIG. 7.
Figure 9:
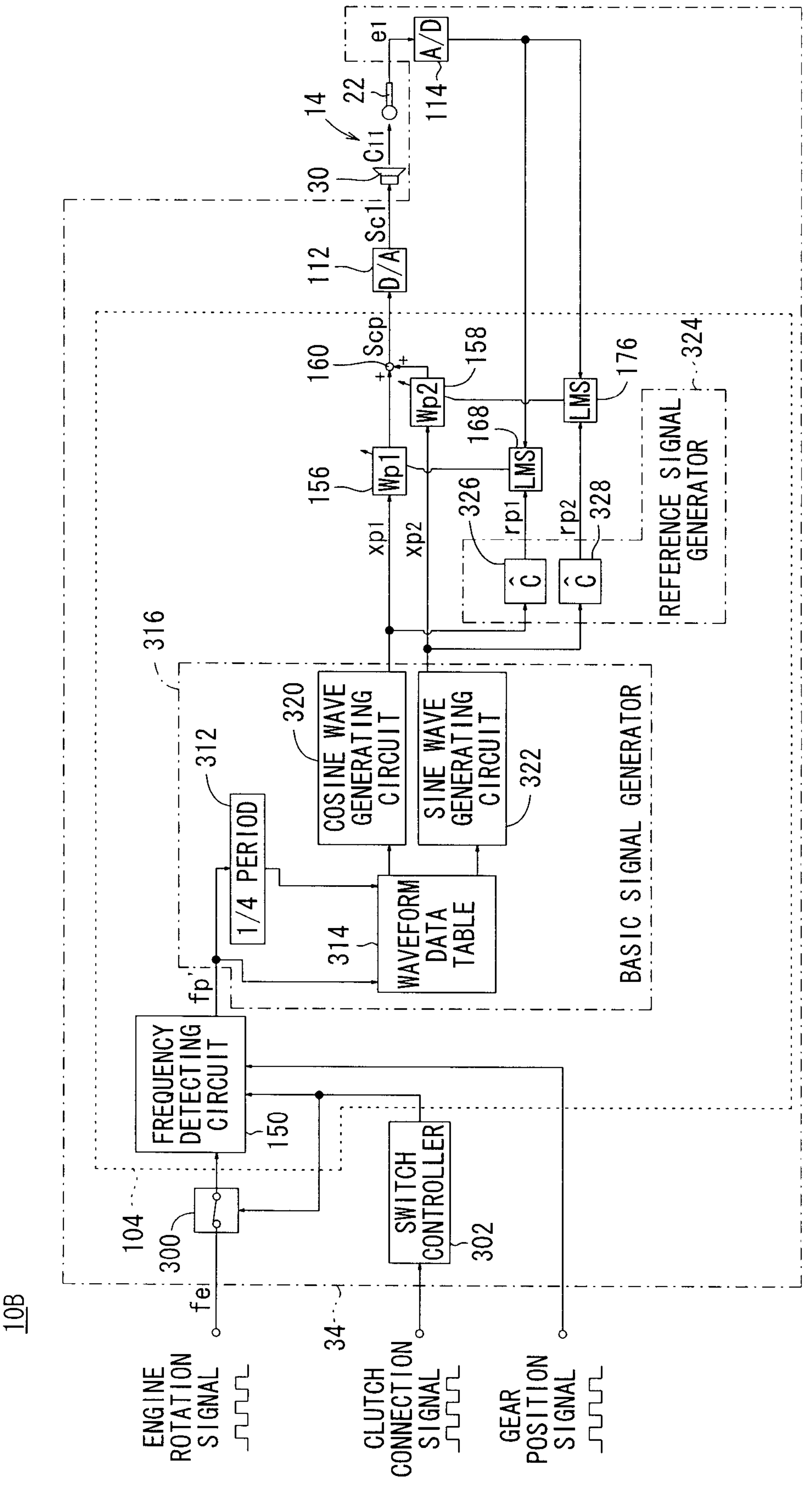
FIG. 9 is a functional block diagram of the vehicular active noise control system shown in FIG. 7.

In FIGS. 7 and 8, if the vehicle 12 is an automatic transmission vehicle, then the AT controller 410 supplies the electronic controller 34 with the gear position signal and the clutch connection signal. However, it is assumed that the vehicle 12 is a manual transmission vehicle in the second embodiment and other subsequent embodiments.

When the switch controller 302 is supplied with the clutch connection signal from the engine control ECU 38, the switch controller 302 outputs a disconnection signal Ss indicating that the clutch 42 has disconnected the transmission 45 from the engine 36, to the control circuit 104 and the switch 300. When the disconnection signal Ss is not input to the switch 300, the switch 300 is turned on, supplying the engine rotation signal to the control circuit 104. When the disconnection signal Ss is input to the switch 300, the switch 300 is turned off, stopping supplying the engine rotation signal to the control circuit 104.

When the disconnection signal Ss is not input to the frequency detecting circuit 150, the frequency detecting circuit 150 estimates the frequency (rotation frequency) fp of the propeller shaft 76 (see FIG. 8) from the frequency fe of the engine rotation signal (engine rotation pulses) supplied from the switch 300.

A process of estimating the frequency fp from the frequency fe in the frequency detecting circuit 150 will be described below.

The frequency detecting circuit 150 calculates (estimates) the frequency fp from the frequency fe according to the following equation (7):

$$fp = fe \times (Hr/Hn) \times (Fr/Fn) \times (Br/Bn) \times (Tr/Tn) \quad (7)$$

For example, if the transfer gear ratio Hr/Hn indicated by the gear position signal input to the frequency detecting circuit 150 is a 5th-speed gear ratio, (Hr/Hn)×(Fr/Fn)×(Br/Bn)×(Tr/Tn)=1.5357, and the engine rotational speed is 3000 [rpm], then since fe=50 [Hz] (=3000 [rpm]/60 [s]), fp=76.8 [Hz].

The process of estimating the frequency fp of the propeller shaft 76 according to the equation (7) is applicable when the engine 36 and the transmission 45 are connected to each other by the clutch 42. In other words, when the frequency detecting circuit 150 is supplied with the disconnection signal Ss, the frequency detecting circuit 150 stops estimating the frequency fp of the propeller shaft 76.

As described above, when the engine 36 and the transmission 45 are connected to each other by the clutch 42, the system 10B estimates the (rotation) frequency fp of the propeller shaft 76 as a driveline rotary component from the frequency fe of engine rotation pulses, and generates the basic signals (the basic cosine wave signal xp1 and the basic sine wave signal xp2) which have the control frequency fp' that is a harmonic of the frequency fp. Therefore, as with the system 10A according to the first embodiment, the system 10B is capable of well silencing the driveline noise at the position of the microphone 22, and allows the vehicle 12 as a whole to be reduced in weight and cost.

The frequency detecting circuit 150 calculates the frequency fp and the control frequency fp' using the frequency fe of engine rotation pulses. Consequently, the system 10B also can easily generate the control signal Scp for canceling out the driveline noise.

As the frequency detecting circuit 150 calculates the frequency fp of the propeller shaft 76 from the frequency fe of engine rotation pulses according to the equation (7), the frequency detecting circuit 150 can easily calculate the frequency fp of the propeller shaft 76 from the engine rotation pulses.

Figure 10:
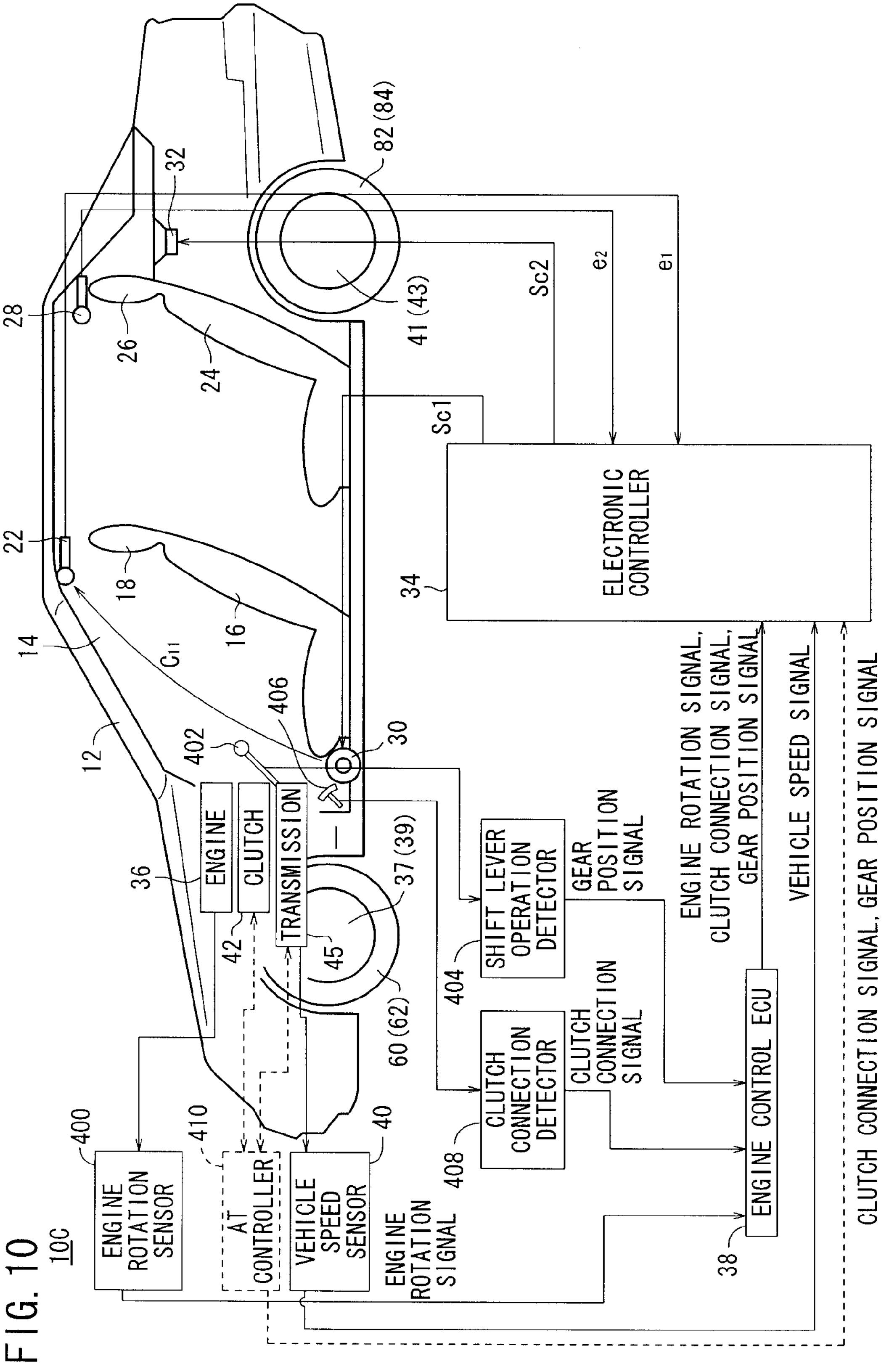
FIG. 10 is a side elevational view, partly in block form, of a vehicle incorporating a vehicular active noise control system according to a third embodiment of the present invention.
Figure 11:
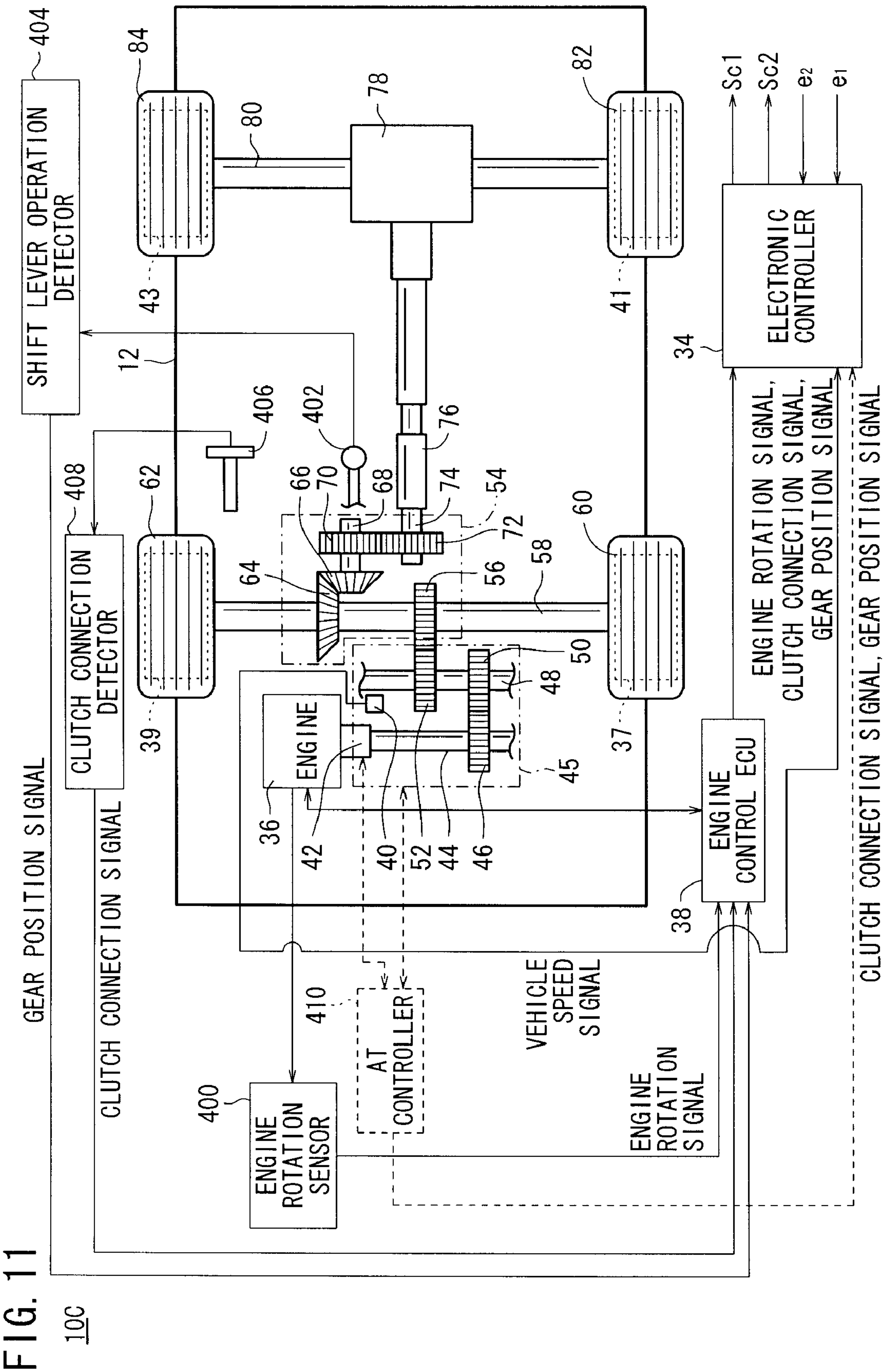
FIG. 11 is a schematic plan view showing a driveline of the vehicle shown in FIG. 10.
Figure 12:
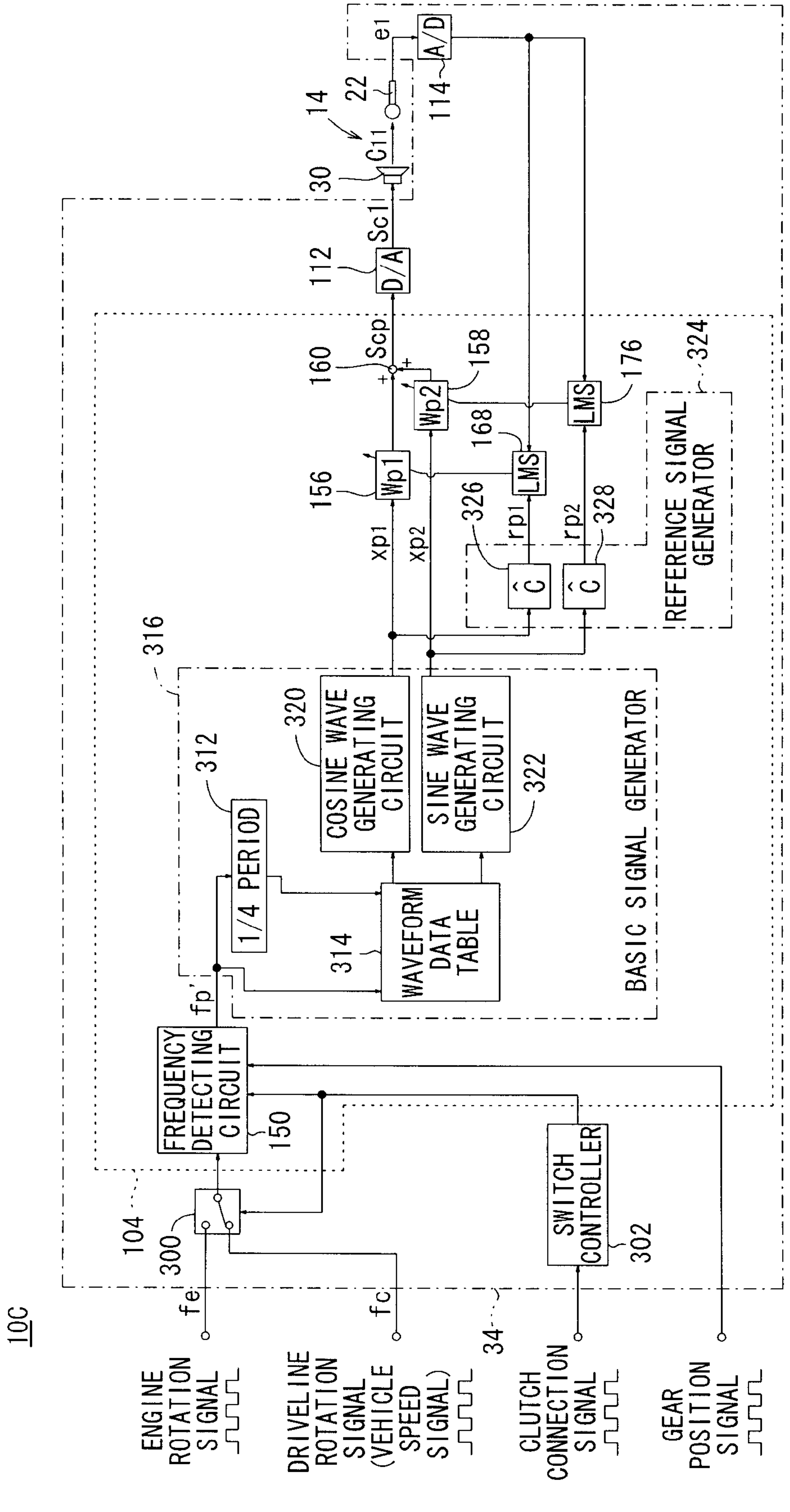
FIG. 12 is a functional block diagram of the vehicular active noise control system shown in FIG. 10.

A system 10C according to a third embodiment of the present invention will be described below with reference to FIGS. 10 through 12.

In the system 10C, the electronic controller 34 is supplied with the vehicle speed signal from the vehicle speed sensor 40, and is also supplied with the engine rotation signal, the gear position signal, and the clutch connection signal from the engine control ECU 38. Based on the vehicle speed signal, the engine rotation signal, the gear position signal, and the clutch connection signal, the electronic controller 34 generates control signals Sc1, Sc2. The electronic controller 34 has a switch 300 and a switch controller 302. The switch 300 is a selector switch which supplies the engine rotation signal to the control circuit 104 when the disconnection signal Ss is not input to the switch 300, and supplies the vehicle speed signal to the control circuit 104 when the disconnection signal Ss is input to the switch 300.

When the disconnection signal Ss is not input to the frequency detecting circuit 150, the frequency detecting circuit 150 estimates the frequency fp of the propeller shaft 76 (see FIG. 11) from the frequency fe of the engine rotation signal according to the equation (7). When the disconnection signal Ss is input to the frequency detecting circuit 150, the frequency detecting circuit 150 estimates the frequency fp of the propeller shaft 76 from the frequency fc of vehicle speed pulses according to the equation (1).

As described above, in the system 10B according to the third embodiment, when the switch controller 302 outputs the disconnection signal Ss to the switch 300 and the frequency detecting circuit 150, the switch 300 changes its connections to supply vehicle speed pulses, rather than engine rotation pulses, to the frequency detecting circuit 150. Based on the input disconnection signal Ss, the frequency detecting circuit 150 quickly changes from the calculation of the frequency fp based on the engine rotation pulses to the calculation of the frequency fp based on the vehicle speed pulses. Therefore, the frequency detecting circuit 150 continuously calculates the frequency fp. Since the frequency detecting circuit 150 can output the control frequency fp' based on the frequency fp to the basic signal generator 316 even when the engine 36 and the transmission 45 are disconnected from each other by the clutch 42, the control circuit 104 can continuously silence the driveline noise at the position of the microphone 22.

In the third embodiment, the frequency detecting circuit 150 changes from the calculation of the frequency fp based on the engine rotation pulses to the calculation of the frequency fp based on the vehicle speed pulses, based on the disconnection signal Ss input thereto. However, regardless of whether the disconnection signal Ss is input or not, the switch 300 may supply vehicle speed pulses to the frequency detecting circuit 150 to enable the frequency detecting circuit 150 to calculate the frequency fp based on the vehicle speed pulses.

Figure 13:
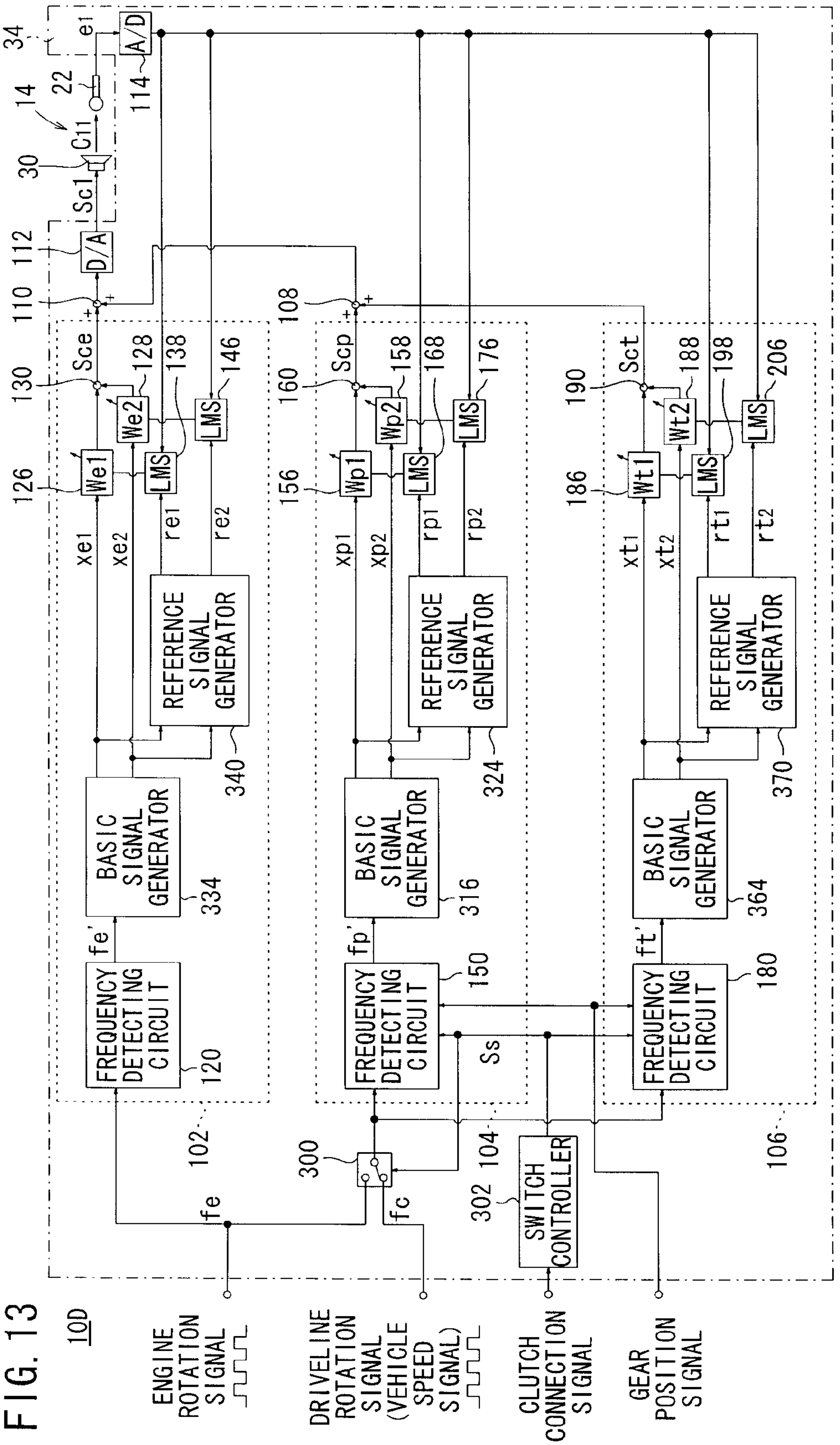
FIG. 13 is a side elevational view, partly in block form, of a vehicle incorporating a vehicular active noise control system according to a fourth embodiment of the present invention.

A system 10D according to a fourth embodiment of the present invention will be described below with reference to FIGS. 13 through 14C.

The system 10D is different from the system 10C (see FIGS. 10 through 12) as to the following features. The vibratory noise source comprises the propeller shaft 76 (see FIG. 11), the engine 36, the drive shaft 58, or the tires 60, 62. The system 10D includes, in addition to the control circuit 104 for reducing the driveline noise at the position of the microphone 22 due to the vibratory noise produced upon rotation of the propeller shaft 76, a control circuit 102 for reducing an engine noise (engine muffled sound) at the position of the microphone 22 due to the vibratory noise produced by the engine 36, and a control circuit 106 for reducing a driveline noise at the position of the microphone 22 due to the vibratory noise produced upon rotation of the drive shaft 58 or the tires 60, 62. The control circuits 102, 104, 106 generate respective control signals Sce, Scp, Sct, which are combined into a control signal Sc1. The speaker 30 outputs a canceling sound based on the control signal Sc1 into the passenger compartment 14 to reduce the in-compartment noise including the engine noise and the driveline noises.

The control circuits 102, 104, 106 are substantially identical in structure to each other. Specifically, the control circuits 102, 104, 106 have respective frequency detecting circuits 120, 150, 180, respective basic signal generators 316, 334, 364, respective reference signal generators 324, 340, 370, respective pairs of adaptive filters 126, 128, 156, 158, 186, 188, and respective pairs of filter coefficient updating units 138, 146, 168, 176, 198, 206.

In the control circuit 102 for reducing the engine noise, the frequency detecting circuit 120 generates a control frequency fe' which is a harmonic (a real multiple) of the frequency fe of engine rotation pulses based on the engine rotation signal (engine rotation pulses). The basic signal generator 334 generates a basic cosine signal xe1 and a basic sine signal xe2 of the control frequency fe', and the reference signal generator 340 generates reference signals re1, re2 based on the basic cosine signal xe1 and the basic sine signal xe2.

In the control circuit 106 for reducing a driveline noise due to the rotation of the drive shaft 58 or the tires 60, 62, the frequency detecting circuit 180 estimates a frequency ft of the drive shaft 58 or the tires 60, 62 based on the frequency fe of engine rotation pulses or the frequency fc of vehicle speed pulses supplied from the switch 300, and calculates a control frequency ft' which is a harmonic (a real multiple) of the frequency ft.

Specifically, when the engine rotation pulses are input to the frequency detecting circuit 180, the frequency detecting circuit 180 estimates the frequency ft of the drive shaft 58 or the tires 60, 62 from the frequency fe of engine rotation pulses according to the following equation (8):

$$ft=fe\times(Hr/Hn)\times(Fr/Fn) \quad (8)$$

When the vehicle speed pulses are input to the frequency detecting circuit 180, the frequency detecting circuit 180 estimates the frequency ft from the frequency fc of the vehicle speed pulses according to the following equation (9):

$$ft=fc\times\alpha\times(Fr/Fn) \quad (9)$$

For example, if fc=58.8 [Hz] and Fr/Fn=0.1854, then ft=10.9 [Hz].

The frequency detecting circuit 180 then calculates a control frequency ft' (=10.9×3=32.7 [Hz]) which is a harmonic (e.g., of a third degree) of the frequency ft, and outputs the calculated control frequency ft' to the basic signal generator 364.

The basic signal generator 364 generates a basic cosine signal xt1 and a basic sine signal xt2 of the control frequency ft', and the reference signal generator 370 generates reference signals rt1, rt2 based on the basic cosine signal xt1 and the basic sine signal xt2.

The operation of the basic signal generators 334, 364 to generate the basic cosine signals xe1, xt1 and basic sine signals xe2, xt2, and the operation of the reference signal generators 340, 370 to generate the reference signals re1, re2, rt1, rt2 are essentially the same as the operation of the basic signal generator 316 to generate the basic signals xp1, xp2 and the operation of the reference signal generator 324 to generate the reference signals rp1, rp2, and will not be described in detail below.

The adaptive filters 126, 128, 186, 188 and the filter coefficient updating units 138, 146, 198, 206 operate in essentially the same manner as the adaptive filters 156, 158 and the filter coefficient updating units 168, 176, and hence their operations will not be described in detail below.

The control signals Scp, Sct output from the control circuits 104, 106 are added by the adder 108 into a sum signal, which is output to the adder 110. The adder 110 adds the control signal Sce from the control circuit 102 and the sum signal (Scp+Sct) from the adder 108 into a control signal, which is output through the DAC 112 to the speaker 30 as a control signal Sc1.

Figure 14A:
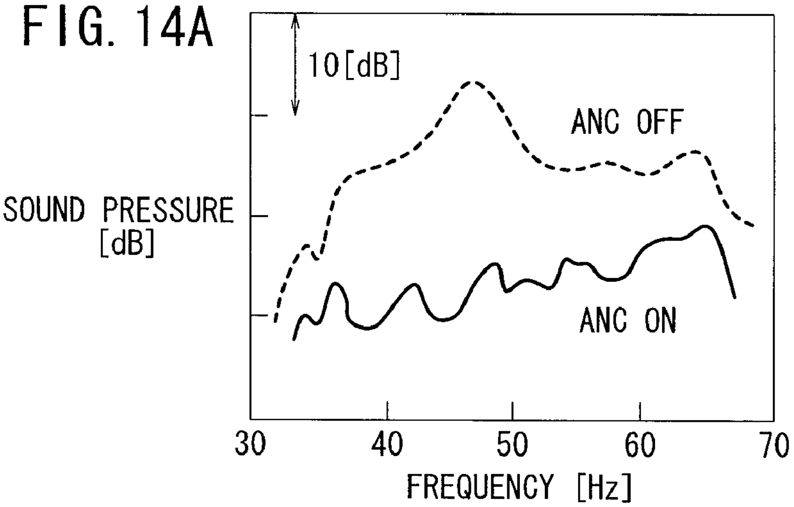
FIGS. 14A through 14C are diagrams showing characteristic curves illustrative of a noise silencing control process carried out by the vehicular active noise control system shown in FIG. 13.
Figure 14B:
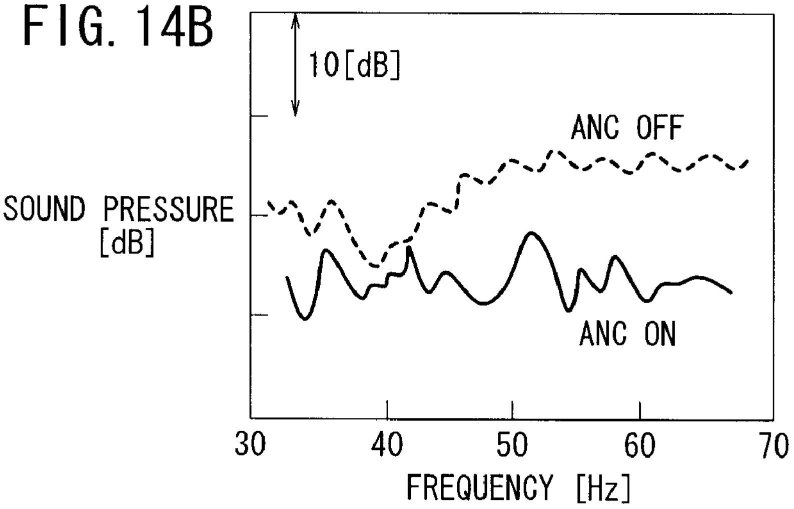
Figure 14C:
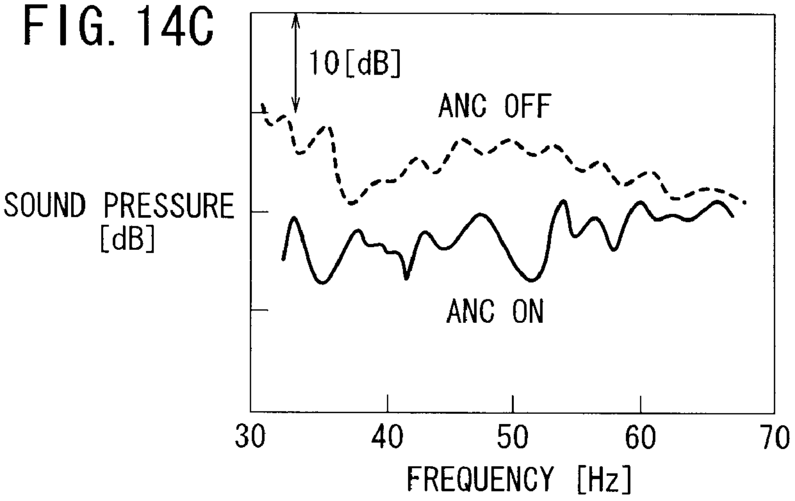

FIGS. 14A through 14C show characteristic curves indicative of reductions achieved by the system 10D in the in-compartment noise at the position of the microphone 22. FIG. 14A shows characteristic curves indicative of a reduction in the driveline noise caused by the vibratory noise of the propeller shaft 76 (see FIG. 11). FIG. 14B shows characteristic curves indicative of a reduction in the driveline noise caused by the vibratory noise of the drive shaft 58 or the tires 60, 62. FIG. 14C shows characteristic curves indicative of a reduction in the engine noise. It can be seen from the characteristic curves shown in FIGS. 14A through 14C that the above noises are silenced when the control circuits 102, 104, 106 perform their silencing control processes (ANC turned on), but not when the control circuits 102, 104, 106 do not perform their silencing control processes (ANC turned off).

Specifically, the control circuit 104 (see FIG. 13) generates the control signal Scp of the control frequency fp' which is a harmonic based on the frequency fp of the propeller shaft 76 (see FIG. 11), and the canceling sound based on the control signal Scp is output from the speaker 30 to reduce the driveline noise at the position of the microphone 22 due to the vibratory noise of the propeller shaft 76 (see FIG. 14A). The control circuit 106 generates the control signal Sct of the control frequency ft' which is a harmonic based on the frequency ft of the drive shaft 58 or the tires 60, 62, and the canceling sound based on the control signal Sct is output from the speaker 30 to reduce the driveline noise at the position of the microphone 22 due to the vibratory noise of the drive shaft 58 or the tires 60, 62 (see FIG. 14B). The control circuit 102 generates the control signal Sce of the control frequency fe' which is a harmonic based on the frequency fe, and the canceling sound based on the control signal Sce is output from the speaker 30 to reduce the engine noise at the position of the microphone 22 (see FIG. 14C).

The system 10D according to the fourth embodiment offers the same advantages as those of the system 10C according to the third embodiment (see FIGS. 10 through 12), and is also capable of silencing the driveline noise caused by the drive shaft 58 or the tires 60, 62 and also the engine noise. Therefore, the system 10D is highly effective to cancel out the in-compartment noise.

Figure 15:
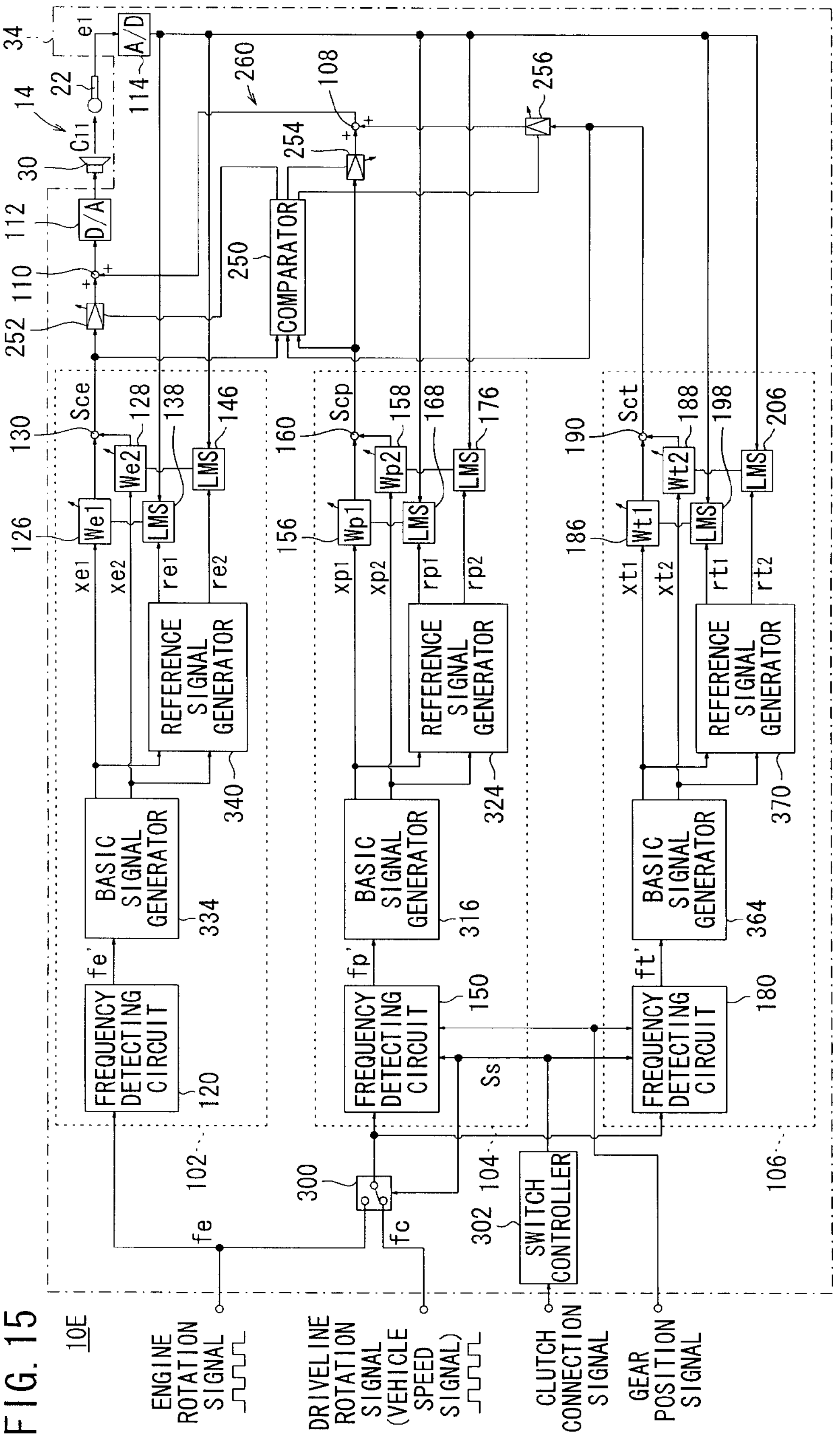
FIG. 15 is a functional block diagram of a vehicular active noise control system according to a fifth embodiment of the present invention.

A system 10E according to a fifth embodiment will be described below with reference to FIG. 15.

The system 10E is different from the system 10D according to the fourth embodiment (see FIG. 13) in that the electronic controller 34 additionally includes a comparing and adjusting unit 260 having a comparator 250 and variable-gain amplifiers 252, 254, 256 and connected to the output terminals of the control circuits 102, 104, 106.

The comparator 250 compares the control frequency fe' of the control signal Sce, the control frequency fp' of the control signal Scp, and the control frequency ft' of the control signal Sct, and adjusts the gains of the variable-gain amplifiers 252, 254, 256 if these control frequencies fe', fp', ft' are the same as or close to each other.

Specifically, if the control frequencies fe', fp', ft' are the same as each other (fe'=fp'=ft'), then the comparator 250 adjusts the gains of the variable-gain amplifiers 254, 256 to zero (0). Therefore, only the control signal Sce is supplied through the adder 110 and the DAC 112 to the speaker 30, so that the noise in the passenger compartment 14 is silenced based on the control signal Sce.

If the control frequencies fe', fp', ft' are close to each other, then the comparator 250 adjusts the gains of the variable-gain amplifiers 252, 254, 256 such that the gains of the variable-gain amplifiers 254, 256 are lower than the gain of the variable-gain amplifier 252. Therefore, the control signal Sce and the control signals Scp, Sct which are lower in output level than the control signal Sce are supplied to the adder 110, so that the noise in the passenger compartment 14 is silenced based on the control signals Sce, Scp, Sct. Specifically, the canceling sound based on the control signal Sce which has the relatively high output level silences the noise of the same frequency as the control frequency fe' of the control signal Sce, and the canceling sound also reduces noises having frequencies close to the control frequency fe' of the control signal Sce. The reduced noises are silenced by the canceling sounds based on the control signals Scp, Sct having the lower output levels. The in-compartment noise is reliably canceled out.

The system 10E according to the fifth embodiment offers the advantages of the systems 10C, 10D according to the third and fourth embodiments (see FIGS. 10 through 13), and is additionally capable of efficiently canceling out the in-compartment noise at the position of the microphone 22 because of the comparing and adjusting unit 260.

In each of the above embodiments, the vehicle speed sensor 40 outputs a vehicle speed signal (vehicle speed pulses) representing the rotational speed of the countershaft 48. However, another signal in synchronism with the vehicle speed, such as the rotational speed of the main shaft 44, the rotational speeds of the drive shafts 58, 80, or the rotational speed of the propeller shaft 76, may directly be detected by the vehicle speed sensor 40, and vehicle speed pulses depending on the detected rotational speed may be output from the vehicle speed sensor 40 to the electronic controller 34 for the control circuits 104, 106 to reduce the driveline noise.

In each of the above embodiments, the vehicle 12 has been described as a 4WD (AWD) vehicle. However, the present invention is also applicable to vehicles of other drive types, such as FF, FR, RR, MR types, as the electronic controller 34 may comprise an appropriate combinations of control circuits 102, 104, 106.

In each of the above embodiments, when the control circuits 102, 104, 106 start or stop operating or the switch 300 changes its connections, if the values of the filter coefficients We1, We2, Wp1, Wp2, Wt1, Wt2 are sequentially reduced or increased to smoothly attenuate or amplify the canceling sound output from the speaker 30 according to a fade-out or fade-in process, then uncomfortable vibratory noises are prevented from being produced at the time the control circuits 102, 104, 106 start or stop operating or the switch 300 changes its connections.

In each of the above embodiments, the reduction of the in-compartment noise at the position of the microphone 22 has been described. The in-compartment noise at the position of the microphone 28 can also be reduced by the control circuits 102, 104, 106.

Although certain preferred embodiments of the present invention have been shown and described in detail, it should be understood that various changes and modifications may be made therein without departing from the scope of the appended claims.

What is claimed is:

1. A vehicular active noise control system, comprising:

a basic signal generator for generating a basic signal having a predetermined control frequency based on a frequency of a vibratory noise generated by a vibratory noise source of a vehicle;

an adaptive filter for generating a control signal to cancel out an in-compartment noise produced in a passenger compartment of said vehicle by said vibratory noise, based on said basic signal;

a sound outputting device for outputting a canceling sound based on said control signal into said passenger compartment;

an error signal detector for detecting a canceling error sound between said in-compartment noise and said canceling sound and outputting an error signal representing said detected canceling error sound;

a reference signal generator for correcting said basic signal based on a corrective value representing transfer characteristics from said sound outputting device to said error signal detector corresponding to said control frequency, and outputting said corrected basic signal as a reference signal;

a filter coefficient updating unit for sequentially updating a filter coefficient of said adaptive filter to minimize said error signal, based on said error signal and said reference signal;

a vehicle speed detector for detecting a vehicle speed of said vehicle and outputting a vehicle speed signal representing said detected vehicle speed; and a frequency calculating unit for calculating said control frequency which is a harmonic of a rotation frequency of a driveline rotary component of said vehicle which serves as said vibratory noise source, based on said vehicle speed signal, and outputting said calculated control frequency to said basic signal generator;

wherein said basic signal generator has a waveform data table for storing waveform data in one cyclic period, and generates said basic signal having said control frequency by successively reading said waveform data from said waveform data table at each sampling event.

2. A vehicular active noise control system, comprising:

a basic signal generator for generating a basic signal having a predetermined control frequency based on a frequency of a vibratory noise generated by a vibratory noise source of a vehicle;

an adaptive filter for generating a control signal to cancel out an in-compartment noise produced in a passenger compartment of said vehicle by said vibratory noise, based on said basic signal;

a sound outputting device for outputting a canceling sound based on said control signal into said passenger compartment;

an error signal detector for detecting a canceling error sound between said in-compartment noise and said canceling sound and outputting an error signal representing said detected canceling error sound;

a reference signal generator for correcting said basic signal based on a corrective value representing transfer characteristics from said sound outputting device to said error signal detector corresponding to said control frequency, and outputting said corrected basic signal as a reference signal;

a filter coefficient updating unit for sequentially updating a filter coefficient of said adaptive filter to minimize said error signal, based on said error signal and said reference signal;

an engine rotational speed detector for detecting an engine rotational speed of an engine of said vehicle; and a frequency calculating unit for calculating said control frequency which is a harmonic of a rotation frequency of a driveline rotary component of said vehicle which serves as said vibratory noise source, based on said engine rotational speed, and outputting said calculated control frequency to said basic signal generator;

wherein said basic signal generator has a waveform data table for storing waveform data in one cyclic period, and generates said basic signal having said control frequency by successively reading said waveform data from said waveform data table at each sampling event.

3. A vehicular active noise control system., comprising:

a basic signal generator for generating a basic signal having a predetermined control frequency based on a frequency of a vibratory noise generated by a vibratory noise source of a vehicle;

an adaptive filter for generating a control signal to cancel out an in-compartment noise produced in a passenger compartment of said vehicle by said vibratory noise, based on said basic signal;

a sound outputting device for outputting a canceling sound based on said control signal into said passenger compartment;

an error signal detector for detecting a canceling error sound between said in-compartment noise and said canceling sound and outputting an error signal representing said detected canceling error sound;

a reference signal generator for correcting said basic signal based on a corrective value representing transfer characteristics from said sound outputting device to said error signal detector corresponding to said control frequency, and outputting said corrected basic signal as a reference signal;

a filter coefficient updating unit for sequentially updating a filter coefficient of said adaptive filter to minimize said error signal, based on said error signal and said reference signal;

a vehicle speed detector for detecting a vehicle speed of said vehicle and outputting a vehicle speed signal representing said detected vehicle speed;

an engine rotational speed detector for detecting an engine rotational speed of an engine of said vehicle; and a frequency calculating unit for calculating said control frequency which is a harmonic of a rotation frequency of a driveline rotary component of said vehicle which serves as said vibratory noise source, based on said vehicle speed signal or said engine rotational speed, and outputting said calculated control frequency to said basic signal generator;

wherein said basic signal generator has a waveform data table for storing waveform data in one cyclic period, and generates said basic signal having said control frequency by successively reading said waveform data from said waveform data table at each sampling event.

4. The vehicular active noise control system according to claim 1, wherein said vehicle speed detector outputs said vehicle speed signal based on a rotational speed of a countershaft.

5. The vehicular active noise control system according to claim 1, wherein said driveline rotary component comprises a propeller shaft, a drive shaft, or a tire.

6. The vehicular active noise control system according to claim 2, wherein said driveline rotary component comprises a propeller shaft, and said frequency calculating unit calculates said rotation frequency of said propeller shaft by multiplying a frequency depending on said engine rotational speed by a transmission gear ratio, a final gear ratio, a bevel gear ratio, and a transfer gear ratio.

7. The vehicular active noise control system according to claim 2, wherein said driveline rotary component comprises a drive shaft or a tire, and said frequency calculating unit calculates said rotation frequency of said drive shaft or said tire by multiplying a frequency depending on said engine rotational speed by a transmission gear ratio or a final gear ratio.

8. The vehicular active noise control system according to claim 6, further comprising:

a connected state output unit for outputting a disconnection signal indicating that said engine and a transmission of said vehicle are disconnected from each other, to said frequency calculating unit;

wherein said frequency calculating unit stops calculating said rotation frequency when said disconnection signal is input thereto.

9. The vehicular active noise control system according to claim 1, wherein said driveline rotary component comprises a propeller shaft, and said frequency calculating unit calculates said rotation frequency of said propeller shaft by multiplying a frequency of said vehicle speed signal by a predetermined conversion value for conversion between a rotational speed of a countershaft and said vehicle speed signal, a final gear ratio, a bevel gear ratio, and a transfer gear ratio.

10. The vehicular active noise control system according to claim 1, wherein said driveline rotary component comprises a drive shaft or a tire, and said frequency calculating unit calculates a rotation frequency of said drive shaft or said tire by multiplying a frequency of said vehicle speed signal by a predetermined conversion value for conversion between a rotational speed of a countershaft and said vehicle speed signal, and a final gear ratio.

11. The vehicular active noise control system according to claim 9, further comprising:

an engine rotational speed detector for detecting an engine rotational speed of an engine of said vehicle; and a connected state output unit for outputting a disconnection signal indicating that said engine and a transmission of said vehicle are disconnected from each other, to said frequency calculating unit;

wherein said frequency calculating unit calculates said rotation frequency based on said vehicle speed signal or said engine rotational speed when said disconnection signal is not input thereto, and calculates said rotation frequency based on said vehicle speed signal when said disconnection signal is input thereto.

12. The vehicular active noise control system according to claim 1, wherein said control frequency comprises a frequency which is a real multiple of said rotation frequency.

13. The vehicular active noise control system according to claim 1, wherein said control signal comprises a first control signal for canceling out a driveline noise produced in said passenger compartment by said vibratory noise generated by said driveline rotary component, said vehicular active noise control system further comprising:

an active noise control apparatus for generating a second control signal to cancel out an engine noise produced in said passenger compartment by an engine vibratory noise generated by an engine of said vehicle which serves as said vibratory noise source, based on said engine vibratory noise; and a signal combining unit for combining said first control signal and said second control signal into a combined signal, and outputting said combined signal to said sound outputting device.

14. The vehicular active noise control system according to claim 13, further comprising:

a comparing and adjusting unit for comparing a control frequency of said first control signal and a control frequency of said second control signal with each other, and stopping outputting one of said first and second control signals to said signal combining unit or changing an output level of one of said first and second control signals if said control frequencies of said first and second control signals are the same as or close to each other.

* * * * *